(12) United States Patent
Tesar

(10) Patent No.: US 9,915,319 B2
(45) Date of Patent: Mar. 13, 2018

(54) COMPACT PARALLEL ECCENTRIC ROTARY ACTUATOR

(71) Applicant: Delbert Tesar, Austin, TX (US)

(72) Inventor: Delbert Tesar, Austin, TX (US)

( * ) Notice: Subject to any disclaimer, the term of this patent is extended or adjusted under 35 U.S.C. 154(b) by 294 days.

(21) Appl. No.: 14/869,994

(22) Filed: Sep. 29, 2015

(65) Prior Publication Data

US 2016/0091054 A1     Mar. 31, 2016

Related U.S. Application Data

(60) Provisional application No. 62/057,216, filed on Sep. 29, 2014, provisional application No. 62/210,223, filed on Aug. 26, 2015.

(51) Int. Cl.
    *F16H 1/32*         (2006.01)
    *H02K 7/116*      (2006.01)
    *F16H 57/04*      (2010.01)

(52) U.S. Cl.
    CPC .............. *F16H 1/32* (2013.01); *H02K 7/116* (2013.01); *F16H 57/0436* (2013.01); *F16H 57/0486* (2013.01)

(58) Field of Classification Search
None
See application file for complete search history.

(56) References Cited

U.S. PATENT DOCUMENTS

| | | |
|---|---|---|
| 276,776 A | 5/1883 | Clemons |
| 341,389 A | 5/1886 | Prescott |
| 386,168 A | 7/1888 | Spencer et al. |
| 1,601,750 A | 10/1926 | Wildhaber |
| 2,084,844 A | 6/1937 | Harris |

(Continued)

FOREIGN PATENT DOCUMENTS

| | | |
|---|---|---|
| DE | 42 26 133 C1 | 12/1992 |
| DE | 197 14 528 A1 | 4/1997 |
| EP | 0058025 A1 | 8/1982 |
| EP | 0527483 A2 | 2/1993 |
| EP | 2149724 A1 | 2/2010 |
| EP | 2169263 B1 | 3/2010 |
| GB | 008203 | 0/1903 |
| GB | 224449 | 11/1924 |
| GB | 419171 | 11/1934 |

(Continued)

OTHER PUBLICATIONS

Shin, B. et al.; "Miniaturized Dual Electromagnetic Oscillatory Actuator"; Advanced Science and Technology Letters, 2014, vol. 46, pp. 56-59.

(Continued)

*Primary Examiner* — Justin Holmes
(74) *Attorney, Agent, or Firm* — John A. Fortkort; Fortkort & Houston PC

(57) ABSTRACT

A rotary actuator (101) is provided which includes a crankshaft (103), first and second eccentric gears (121), first and second end plates (123), a first crosslink (117) which is disposed between the first eccentric gear and the first end plate, a second crosslink which is disposed between the second eccentric gear and the second end plate, a stator (113) disposed between the first and second eccentric gears, and a rotor (109). Preferably, the rotary actuator further includes first and second support plates (115) which are disposed concentrically about the crankshaft and which are attached to first and second surfaces of the stator, respectively. The foregoing configuration allows the stator to serve as a major structural element, which may enhance the stiffness and reduce the weight of the actuator, while simplifying many of its active components.

17 Claims, 23 Drawing Sheets

(56) References Cited

U.S. PATENT DOCUMENTS

| | | | |
|---|---|---|---|
| 2,748,610 A * | 6/1956 | Schatzel | F16H 1/32 475/162 |
| 2,750,850 A | 6/1956 | Wildhaber | |
| 3,310,990 A | 3/1967 | Zettel | |
| 3,371,552 A | 3/1968 | Soper | |
| 3,402,621 A | 9/1968 | Johnson et al. | |
| 3,454,394 A | 7/1969 | Honobe | |
| 3,705,522 A | 12/1972 | Ogawa | |
| 3,709,055 A | 1/1973 | Grove | |
| 3,729,276 A | 4/1973 | Boyadjieff et al. | |
| 3,907,470 A | 9/1975 | Harle et al. | |
| 3,929,000 A | 12/1975 | Kralowetz | |
| 4,095,150 A | 6/1978 | Senckel | |
| 4,270,401 A | 6/1981 | Davidson | |
| 4,367,424 A | 1/1983 | Presley | |
| 4,407,170 A | 10/1983 | Fukui | |
| 4,505,166 A | 3/1985 | Tesar | |
| 4,768,400 A | 9/1988 | McKay | |
| 4,846,018 A | 7/1989 | Matsumoto et al. | |
| 4,922,781 A | 5/1990 | Peiji | |
| 4,988,581 A | 1/1991 | Wycliffe | |
| 5,102,377 A | 4/1992 | Spanski | |
| 5,116,291 A | 5/1992 | Toyosumi et al. | |
| 5,293,107 A | 3/1994 | Akeel | |
| 5,355,743 A | 10/1994 | Tesar | |
| 5,468,193 A * | 11/1995 | Yamaguchi | F16H 1/32 419/37 |
| 5,683,323 A * | 11/1997 | Imase | F16H 1/32 475/168 |
| 5,692,989 A | 12/1997 | Kamlukin | |
| 5,704,864 A | 1/1998 | Yanagisawa | |
| 5,908,372 A | 6/1999 | Janek | |
| 5,954,609 A | 9/1999 | Fecko | |
| 6,119,542 A | 9/2000 | Arbrink | |
| 6,367,571 B1 | 4/2002 | Schwarz | |
| 6,584,659 B2 | 7/2003 | Legl et al. | |
| 6,672,966 B2 | 1/2004 | Muju et al. | |
| 6,791,215 B2 | 9/2004 | Tesar | |
| 6,948,402 B1 | 9/2005 | Amendolea | |
| 6,991,580 B2 | 1/2006 | Elser et al. | |
| 7,081,062 B2 | 7/2006 | Tesar | |
| 7,122,926 B2 | 10/2006 | Tesar | |
| 7,196,453 B2 | 3/2007 | Izenson et al. | |
| 7,201,700 B2 | 4/2007 | Buxton | |
| 7,431,676 B2 | 10/2008 | Tesar | |
| 7,534,184 B2 | 5/2009 | Tsurumi | |
| 7,552,664 B2 | 6/2009 | Bulatowicz | |
| 7,553,249 B2 | 6/2009 | Nohara | |
| 7,604,559 B2 | 10/2009 | Fujimoto et al. | |
| 7,604,599 B2 | 10/2009 | Fujimoto et al. | |
| 7,641,579 B2 | 1/2010 | Junkers | |
| 7,722,494 B2 | 5/2010 | Tesar | |
| 7,766,634 B2 | 8/2010 | Liavas et al. | |
| 7,811,193 B2 | 10/2010 | Nakamura | |
| 7,935,017 B2 | 5/2011 | Kurita et al. | |
| 7,942,779 B2 | 5/2011 | Kobayashi | |
| 7,976,420 B2 | 7/2011 | Nakamura | |
| 7,988,581 B2 | 8/2011 | Kobayashi | |
| 8,022,564 B2 | 9/2011 | Nohara et al. | |
| 8,029,400 B2 | 10/2011 | Nakamura | |
| 8,033,942 B2 | 10/2011 | Tesar | |
| 8,047,943 B2 | 11/2011 | Nakamura | |
| 8,117,945 B2 | 2/2012 | Nakamura | |
| 8,162,789 B2 | 4/2012 | Takeuchi | |
| 8,235,856 B2 | 8/2012 | Nakamura | |
| 8,308,599 B2 | 11/2012 | Akami | |
| 8,323,140 B2 | 12/2012 | Nakamura | |
| 8,353,798 B2 | 1/2013 | Miyoshi et al. | |
| 8,382,629 B2 | 2/2013 | Hirata | |
| 8,403,789 B2 | 3/2013 | Janek | |
| 8,435,149 B2 | 5/2013 | Koyama et al. | |
| 8,523,732 B2 | 9/2013 | Le Moal | |
| 8,545,357 B2 | 10/2013 | Hibino | |
| 2002/0012595 A1 * | 1/2002 | Kouno | F04B 39/1013 417/559 |
| 2002/0104267 A1 * | 8/2002 | Sato | E05F 11/445 49/350 |
| 2003/0027681 A1 | 2/2003 | Kakemo | |
| 2004/0007923 A1 | 1/2004 | Tesar | |
| 2004/0102274 A1 | 5/2004 | Tesar | |
| 2004/0103742 A1 | 6/2004 | Tesar | |
| 2005/0168084 A1 | 8/2005 | Tesar | |
| 2005/0221945 A1 | 10/2005 | Plath | |
| 2006/0199692 A1 * | 9/2006 | Janek | F16H 1/32 475/162 |
| 2006/0264292 A1 | 11/2006 | Plath | |
| 2007/0168081 A1 | 7/2007 | Shin et al. | |
| 2007/0249457 A1 | 10/2007 | Tesar | |
| 2008/0060473 A1 | 3/2008 | Li | |
| 2008/0079520 A1 | 4/2008 | Vranish | |
| 2008/0139357 A1 | 6/2008 | Fujimoto | |
| 2008/0228104 A1 | 9/2008 | Uber et al. | |
| 2008/0257088 A1 | 10/2008 | Tesar | |
| 2008/0269922 A1 | 10/2008 | Tesar | |
| 2008/0295623 A1 | 12/2008 | Kurita et al. | |
| 2009/0075771 A1 | 3/2009 | Tesar | |
| 2009/0118050 A1 | 5/2009 | Takeuchi | |
| 2010/0048342 A1 * | 2/2010 | Chadwick | F16H 1/32 475/181 |
| 2010/0113206 A1 | 5/2010 | Wang et al. | |
| 2011/0021871 A1 | 1/2011 | Berkelaar | |
| 2012/0088622 A1 | 4/2012 | Tesar | |
| 2012/0175999 A1 | 7/2012 | Rossman | |
| 2012/0204671 A1 | 8/2012 | Tesar | |
| 2012/0215450 A1 | 8/2012 | Ashok et al. | |
| 2012/0232780 A1 | 9/2012 | Delson et al. | |
| 2013/0009522 A1 * | 1/2013 | Ozaki | H02K 7/116 310/67 R |
| 2013/0023373 A1 | 1/2013 | Janek | |
| 2013/0217530 A1 | 8/2013 | Tesar | |
| 2014/0224064 A1 | 8/2014 | Tesar | |
| 2014/0228162 A1 | 8/2014 | Tesar | |
| 2014/0246893 A1 | 9/2014 | Tesar | |
| 2015/0011918 A1 | 1/2015 | Kim et al. | |
| 2015/0081110 A1 | 5/2015 | Houston et al. | |
| 2015/0176583 A1 * | 6/2015 | Murase | F04C 23/02 418/54 |

FOREIGN PATENT DOCUMENTS

| | | |
|---|---|---|
| GB | 426136 | 3/1935 |
| GB | 450246 | 7/1936 |
| GB | 676894 | 8/1952 |
| GB | 759185 | 10/1956 |
| GB | 775629 | 5/1957 |
| GB | 856486 | 12/1960 |
| GB | 926760 | 5/1963 |
| GB | 1083689 | 9/1967 |
| GB | 1104250 | 2/1968 |
| GB | 1176936 | 1/1970 |
| GB | 1179105 | 1/1970 |
| GB | 1378909 | 3/1972 |
| GB | 1409651 | 10/1975 |
| GB | 1453135 | 10/1976 |
| GB | 1453135 A | 10/1976 |
| GB | 1494895 | 12/1977 |
| GB | 2014260 A | 8/1979 |
| GB | 2377740 A | 1/2003 |
| GB | 2387882 A | 10/2003 |
| GB | 2489503 A | 10/2012 |
| WO | 96/04493 A1 | 2/1996 |

OTHER PUBLICATIONS

Morita, T.; "A Miniaturized Levitation System With Motion Control Using a Piezoelectric Actuator"; IEEE Transactions on Control Systems Technology, vol. 10, No. 5, Sep. 2002; 5 pages.

Shin. B. et al.; "Miniaturized Dual Electromagnetic Oscillatory Actuator for Legged Locomotion of Micro Mobile Robots"; International Journal of Control and Automation, vol. 7, No. 8 (2014), pp. 245-256.

(56) References Cited

OTHER PUBLICATIONS

Lind, M. et al.; "Linear Motion Miniature Actuators"; 2nd Tampere International Conference on Machine Automation Sep. 15-18, 1998, Tampere, Finland; 12 pages.
Henderson, David A.; "Novel Piezo Motor Enables Positive Displacement Microfluidic Pump"; NSTI-Nanotech 2007; vol. 3; 4 pages.
"Innovative microactuators: Compact 3.5 mm cubic rotary-linear piezoelectric actuator"; Phys Org; Mar. 25, 2011; 2 pages.
Takato, M. et al.; "A Millimetre-sized Robot Realized by a Piezoelectric Impact-type Rotary Actuator and a Hardware Neuron Model"; International Journal of Advanced Robotic Systems, 2014, 11:99; regular paper; 8 pages.
August, R. et al.; "Dynamics of Planetary Gear Trains"; NASA Contractor Report 3793; Jun. 1984; 238 pages.
"Rotary Actuators"; phd Solutions for Industrial Automation; product brochure; www.phdinc.com; 4 pages.
Bouchilloux, P. et al.; "Finite Element Modeling and Optimization of Tube-Shaped Ultrasonic Motors"; Intl. Center for Actuators and Transducers, Materials Research Laboratory, The Pennsylvania State University; Kirikkale University, Department of Electrical and Electronics Engineering, www.adaptronics.com; Jun. 2003, 11 pages.
McMahon, J.; "Piezo motors and actuators: Streamlining medical device performance"; Designfax Tech for OEM Design Engineers; http://www.designfax.net/enews/20100323/feature-1.asp; Apr. 1, 2015; 5 pages.
Gheorghe, A. et al.; "Complete Modeling of Rotary Ultrasonic Motors Actuated Miniature Piezopump"; Proceedings of the 3rd WSEAS Intl. Conference on Finite Differences-Finite Elements-Finite Folumes-Boundary Elements, Bucharest Romania, 2010; 6 pages.
Penton Media white paper; "Miniaturized linear motion"; 2013; 5 pages.
New Scale Technologies, Inc. product sheet; "New M3-RS Rotary Smart Stage"; www.newscaletech.com; Feb. 4, 2015; 1 page.
Cedrat Technologies white paper; "Micro Piezo Actuators"; Jul. 2010; 2 pages.
Translation of the original manual: "Electric Miniature Rotary Actuator MRD-S"; Assembly and Operating Manual; 36 pages.
Breguet, J.M. et al.; "Applications of piezo-actuated micro-robots in micro-biology and material science"; Laboratoire de Systemes Robotiques, Ecole Polytechnique Federale de Lausanne (LSRO-EPFL), Switzerland; 2007; 8 pages.
McMahon, J.; "Piezo motors & actuators streamline medical device performance"; Physik Instruments; Features; Mar. 2010, BioPhotonics; http://www.photonics.com; 8 pages.
"Piezo Motors and Actuators: Medical Device Performance"; posted in Motors by Heather Thompson on Aug. 6, 2010; http://www.mddionline.com/article/piezo-motors-and-actuators-medical-device-performance; 4 pages.
Debeda, H. et al.; "Development of miniaturized piezoelectric actuators for optical applications realized using LIGA technology"; J. Microel S, 8(3) 1999; pp. 258-263.
Spanner, K. et al.; "Design of Linear Ultrasonic Micro Peizo Motor for Precision Mechatronic Systems"; Physik Instrumente (PI) GmbH & Co. KG, Karlsruhe, Germany; 2006; http://www.physikinstrumente.com; 19 pages.
"Precision Rotation Stages, Goniometers"; PI USA; http://www.pi-usa.us/product/precision_positioning_pi-micros/Precision_Rotary_Stages-Goniometers_Mc.php; Apr. 1, 2015; 9 pages.
Rudy, Ryan Q.; "Miniaturized Thin-Film Piezoelectric Traveling Wave Ultrasonic Motor"; 2014 Thesis directed by Professor Don L DeVoe, Mechanical Engineering; 179 pages.
Sherrit, S. et al.; "Miniaturization of Planar Horn Motors"; Proceedings of SPIE Smart Structures and Materials; San Diego, CA 2012, Paper No. 8345-80; 9 pages.
Spanner, K. et al.; "Design of Miniature Linear Ultrasonic Piezo Motor for Precision Mechatronic Systems"; Physik Instrumente (PI) GmbH & Co. KG, Karlsruhe, Germany; 2006-2010; http://www.physikinstrumente.com; 19 pages.
Ghionea, Adrian et al.; "Utilization of Some Computer Assisted Techniques in Generating and Study of the Hypocycloidal Flanks of the Spur Gear Teeth Stress"; 5th International Meeting of the Carpathian Region Specialists in the Field of Gears; May 2004; 8 pages.
Jones, Chris M. Sr.; "'Real-Time' Travel: A Strategy for Distributed Synchronized Actuator Control Using Open Standards"; Naval Engineers White Paper; 9 pages.
Rabindran, Dinesh et al.; "A Differential-Based Dual Actuator for a Safe Robot Joint: Theory and Experiments"; World Automated Congress (WAC); Aug. 2014; 6 pages.
Tesar, Delbert et al.; "Test-Bed to Measure the Performance Criteria of Actuators"; Robotics Research Group, University of Texas at Austin, 2002 Deliverable for Thread 3: High Performance Envelope Based on Intelligent; Dec. 1, 2001; 14 pages.
Townsend, Dennis P.; "A Comparison of the Double-Circular-Arc-Gear Drives With Standard Involute Gear Drives"; Abstract; www.pumpjack.com/downloads; 8 pages.
Litvin, Faydor L. et al.; "Helical Gears With Circular Arc Teeth: Generation, Geometry, Precision and Adjustment to Errors, Computer Aided Simulation of Conditions of Meshing, and Bearing Contact"; NASA Contractor Report 4089; AVSCOM Technical Report 87-C-18; Oct. 1987; 95 pages.
Krishnamoorthy, Ganesh et al.; "Multi-Sensor Architecture for Intelligent Electromechanical Actuators"; 12th IFToMM World Congress, Besancon, France; Jun. 18-21, 2007; 6 pages.
Lim, Gee Kwang et al.; "Modeling and Simulation of a Stewart Platform Type Parallel Structure Robot"; Final Report, Grant No. NAG 9-188; The University of Texas at Austin, Mechanical Engineering Department; Apr. 1989; 216 pages.
Lee, Hoon et al.; "An Analytical Stiffness Analysis Between Actuator Structure and Principal Bearings Used for Robot Actuators"; Proceedings of ASME 2011 International Design Engineering Technical Conference and Computers and Information in Engineering Conference; IDEC/CIE 2011; Aug. 29-31, 2011; Washington, D.C.; 10 pages.
Koran, Lucas et al.; "Duty Cycle Analysis to Drive Intelligent Actuator Development'"; IEEE Systems Journal; May 2008; 14 pages.
Ashok, Pradeepkumar et al.; "Guidelines for Managing Sensors in Cyber Physical Systems with Multiple Sensors"; Research Article; Hindawi Publishing Corporation, Journal of Sensors; vol. 2011, Article ID 321709; Nov. 22, 2011; 16 pages.
Hvass, Paul Brian et al.; "Condition Based Maintenance for Intelligent Electromechanical Actuators"; Research Paper; Jun. 2004; 262 pages.
Kang, Seong-Ho et al.; "Indoor GPS Metrology System with 3D Probe for Precision Applications"; ASPE.pointinspace.com/publications/annual_2004 Papers; 2004; 4 pages.
Knight, W.; "The Robots Running This Way"; MIT Technology Review; 2014; 8 pages.
Ting, Yung et al.; "A Control Structure for Fault-Tolerant Operation of Robotic Manipulators"; Research Paper; University of Texas at Austin, Department of Mechanical Engineering; Apr. 1993; 10 pages.

\* cited by examiner

-- Prior Art --

-- Prior Art --

*-- Prior Art --*

-- Prior Art --

COMPACT PARALLEL ECCENTRIC ROTARY ACTUATOR

CROSS-REFERENCE TO RELATED APPLICATIONS

This application claims the benefit of priority from U.S. Provisional Application No. 62/057,216, filed Sep. 29, 2014, having the same inventor and the same title, and which is incorporated herein by reference in its entirety; and this application claims the benefit of priority from U.S. Provisional Application No. 62/210,223, filed Aug. 26, 2015, having the same inventor and the same title, and which is incorporated herein by reference in its entirety.

FIELD OF THE DISCLOSURE

The present disclosure relates generally to rotary actuators, and more particularly to parallel eccentric rotary actuators having a compact design.

BACKGROUND OF THE DISCLOSURE

Several parallel eccentric gear trains for rotary actuators are known to the art. For example, U.S. Pat. No. 8,403,789 (Janek), assigned to Spinea S.R.O., discloses a gear train for a parallel eccentric rotary actuator which is reproduced in FIG. 20. The gear train disclosed therein includes a central ring gear 40, left and right end plates 50, a bearing ring 46, a seal 93, left and right cross links 80 equipped with spline grooves (not shown), a crankshaft bearing 10, radial axle bearings 43a, 43b, 43c, a cycloidal curve 30, needles 41b, and through bolts 95. Other gear trains by Spinea of this general type are described, for example, in 2013/0023373 (Janek) and U.S. Pat. No. 5,908,372 (Janek).

U.S. Pat. No. 7,604,559 (Fujimoto et al.), assigned to Nabtesco Corporation, discloses an eccentrically oscillating gear device. This device, which is depicted in FIGS. 21-23, is equipped with an internal gear 15 having internal gear pins 15a, a carrier 11 rotating relative to the internal gear, a pair of bearings 19, 20 that have rolling elements and a ring body for supporting the rolling element, a crank shaft supported by the carrier so as to be freely rotatable and external gears 13, 14 that are equipped with external teeth having a trochoid tooth profile whose tooth top portions are cut out, and disposed between the pair of bearings. The outer peripheries of the external gears are engaged with the internal gear pins and fitted to the crank portion of the crank shaft. The eccentrically oscillating gear device is designed so that the external gear makes an eccentrically oscillating motion by rotation of the crank shaft and the rotational output is taken out from the internal gear or the carrier.

BRIEF DESCRIPTION OF THE DRAWINGS

As seen in FIG. 15, the crankshaft 103 has a hollow shaft 183 with a central portion 182 on which the rotor is supported, and an end bearing support 181 on which the shaft bearings 135 (see FIG. 1) are seated.

SUMMARY OF THE DISCLOSURE

Figure 1:
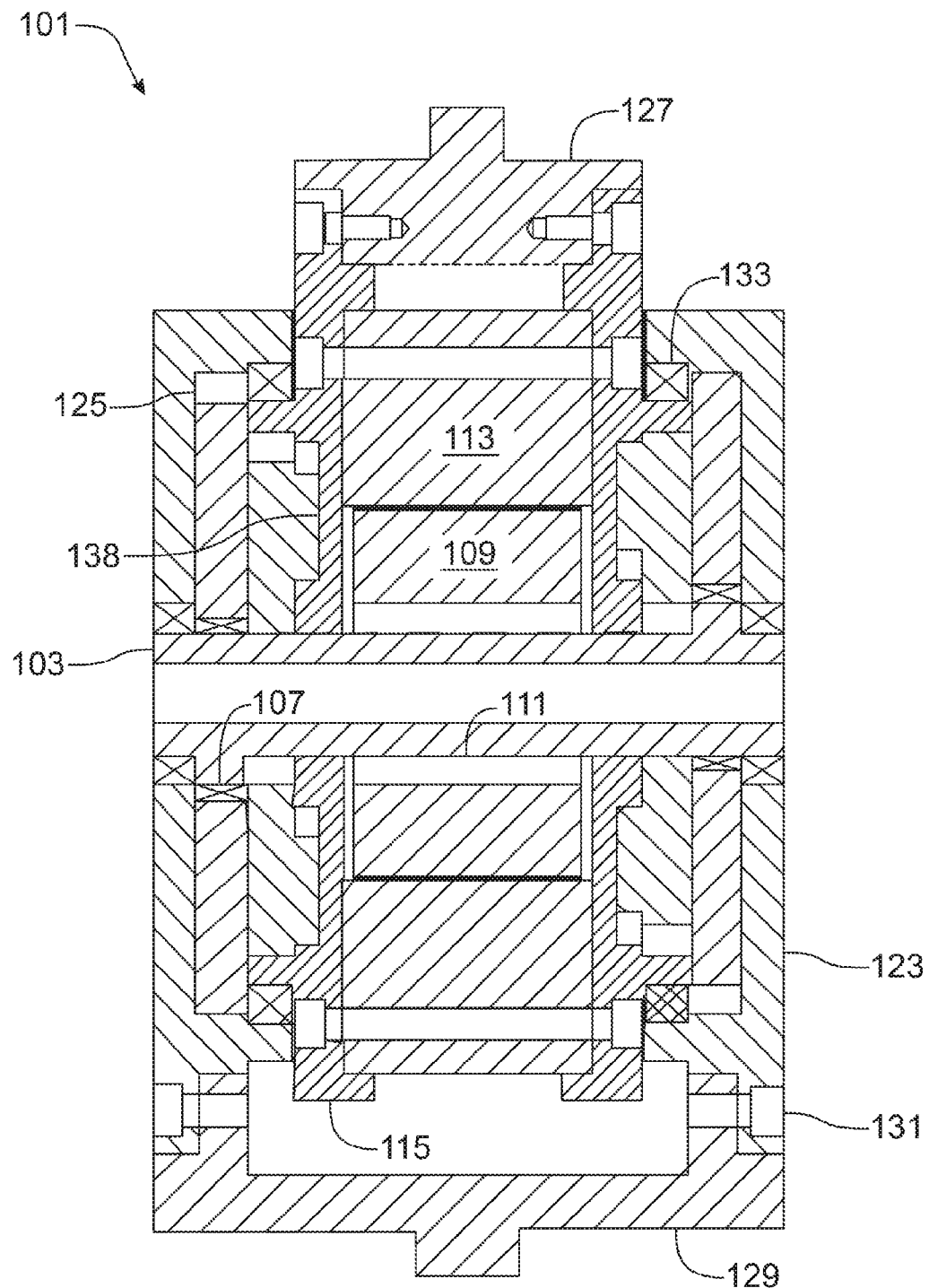
FIG. 1 is a cross-sectional view, taken along a plane within which the axis of the crankshaft lies, of a particular, non-limiting embodiment of a CPE actuator in accordance with the teachings herein in which the stator provides the structural backbone of the device. The prime mover is in the central position. The rotor drives the crankshaft which contains two eccentrics to drive the eccentric gears located near the end plates of the actuator. These eccentric gears oscillate without rotation due to the Oldham coupling made up of a cross link with multiple parallel tongues in similarly shaped grooves in the eccentric gear and a fixed internal plate attached to the stator.

In one aspect, a rotary actuator is provided which comprises (a) a (preferably central) crankshaft; (b) first and second eccentric gears; (c) first and second end plates; (d) a first crosslink which is disposed between said first eccentric gear and said first end plate; (e) a second crosslink disposed between said second eccentric gear and said second end plate; (f) a stator disposed between said first and second eccentric gears; and (g) a rotor. Preferably, the rotary actuator further includes first and second support plates which are disposed concentrically about said crankshaft and which are attached to first and second surfaces of the stator, respectively.

In another aspect, a rotary actuator is provided which comprises (a) a crankshaft; (b) a first eccentric gear which is disposed on a first end of said crankshaft and which is equipped with circular arc gear teeth; (c) a first end plate; and (d) a first crosslink which is disposed between said first eccentric gear and said first end plate, and which has a first set of surface features on a surface thereof which engage a second set of surface features on said first eccentric gear.

In a further aspect, a rotary actuator is provided which comprises (a) a gear train which includes (i) a single output internal gear, (ii) a plurality of rolling element bearings, and (iii) a pair of oscillating, parallel external gears which are equipped with circular arc gear teeth, which mesh with said internal gear, and which are supported by said plurality of roller element bearings; (b) a pair of eccentrics which drive said pair of external gears; and (c) a central crankshaft which drives said pair of eccentrics.

In still another aspect, a rotary actuator is provided which comprises (a) an internal gear; (b) first and second parallel eccentric gears which mesh with said internal gear; (c) a crankshaft equipped with first and second eccentrics which are 180° out-of-phase and which drive said first and second parallel eccentric gears, respectively; (d) a prime mover which drives said crankshaft; (e) first and second crosslinks which prevent the rotation of said first and second parallel eccentric gears, respectively; and (f) first and second sets of splines which engage said first and second parallel eccentric gears, respectively.

DETAILED DESCRIPTION

Heavy construction systems (such as, for example, excavators, mining machines, and hole drillers) are frequently required to perform physical tasks which expose these systems to high levels of shocks and exceptional forces. Most electro-mechanical systems use a gear reducer to amplify (by more than 100×) the low torque output of the prime mover into a high torque level output. This normally requires the use of gears equipped with involute gear teeth and rolling element bearings, both of which are sensitive to peak loads and shocks.

Although commonplace, the use in heavy construction machinery of gear reducers to amplify (by more than 100×) the low torque output of the prime mover into a high torque level output, and the attendant use of involute gear teeth and rolling element bearings, presents several problems. In particular, involute gear teeth have no more than two teeth under load (even if they are helical) and use convex-convex contacts which experience high contact stress levels and high sliding velocities. Similarly, rolling element bearings can be easily indented due to shock, and result in low stiffness when used in small diameters.

Recent advances in the art of rotary actuators have led to the introduction of the Modified Parallel Eccentric (MPE) rotary actuator. This rotary actuator is described, for example, in U.S. Ser. No. 14/732,286 (Tesar), entitled "Modified Parallel Eccentric Rotary Actuator", which was filed on Jun. 5, 2015, and which is incorporated herein by reference in its entirety. The '286 application includes a detailed discussion of the advantages of the MPE rotary actuator over the Spinea and Nabtesco gear trains described above.

For example, in a preferred embodiment of the MPE rotary actuator described in the '286 application, circular arc gear teeth are utilized which have concave-convex contacts. These contacts reduce contact stresses by up to 10× in hypocyclic motion. Moreover, these contacts are self-protective in that more teeth become engaged at higher loads. Thus, under high load conditions, up to 5 teeth may be involved in reducing peak contact stresses by 2 to 3×. Deformation may also be reduced in the MPE by up to 5× through the use of shorter teeth. In addition, this hypocyclic tooth mesh involves zero sliding velocity when the tooth load is at its maximum, which enhances durability and reduces tooth sliding friction losses almost to zero.

The MPE design uses a crankshaft to drive eccentric gears whose bearings are not in the principal load path of the actuator (perhaps 10× less). This design renders the MPE suitable for long life operations at high load and high speed duty cycles. However, while the MPE is a notable advance in the art, duty cycles with high shock levels of the type experienced in heavy construction machinery may threaten the durability of the MPE. There is thus a need for further improvement in the design of parallel eccentric rotary actuators.

It has now been found that the foregoing issues may be addressed with the parallel eccentric rotary actuators disclosed herein. These actuators, which are dubbed "Compact Parallel Eccentric" (CPE) rotary actuators, are especially suitable for heavy shock level duty cycles.

Figure 2:
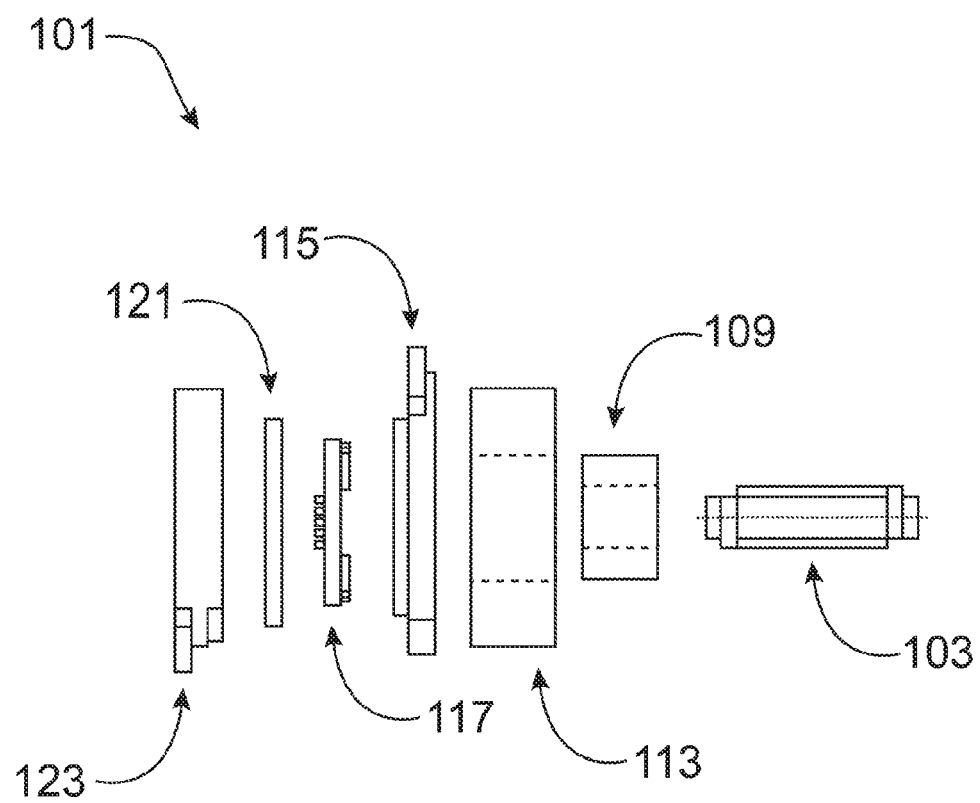
FIG. 2 is an exploded side view of the left half of the actuator of FIG. 1.
Figure 3:
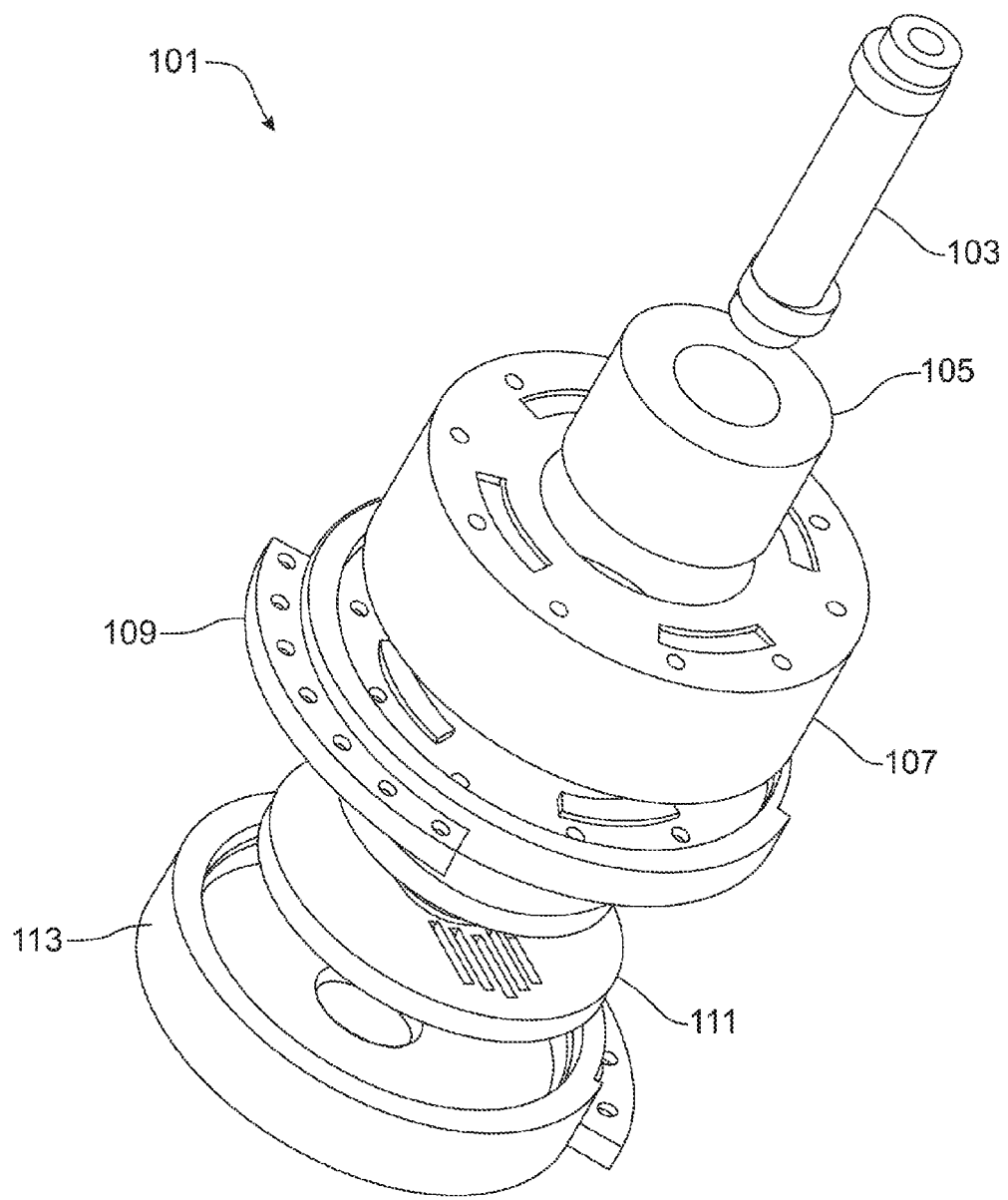
FIG. 3 is an exploded isometric view of the left half of the actuator of FIG. 1.

FIGS. 1-15 depict a first particular, non-limiting embodiment of a CPE rotary actuator in accordance with the teachings herein. With reference to FIGS. 1-3, the particular CPE rotary actuator 101 depicted therein comprises a crankshaft 103 equipped with first and second eccentrics 107. A rotor 109 is rotatably mounted on the crankshaft 103 and is separated therefrom by way of a rotor spacer 111 (see FIG. 1). A stator 113 is rigidly supported on a pair of internal stator support plates 115 in closely spaced-apart relation to the rotor 109.

The CPE rotary actuator 101 is further equipped with first and second crosslinks 117 and with first and second eccentric gears 121. Each eccentric gear 121 is disposed between a crosslink 117 and one of first and second output plates 123 (also referred to herein as output.

As seen in FIG. 1, each crosslink 117 has a gap 125 (see FIG. 1) adjacent thereto, and engages adjacent surfaces of the corresponding eccentric gear 121 and the internal stator support plate 115 across a tongue and groove surface 119. The CPE rotary actuator 101 is further equipped with a reference link 127, an output link 129, attachment lugs 131, principal bearings 133, shaft bearings 135, an internal gear 137, and a tongue and groove mesh 138 between each crosslink 117 and the corresponding adjacent support plate 115.

The CPE rotary actuator 101 of FIGS. 1-3 leverages the structural integrity of the (preferably circular) stator 113 of the prime mover to effectively resist forces/moments in all directions. In particular, the rigidity of the stator 113 is enhanced by the addition of the two internal stator support plates 115 (shown in greater detail in FIGS. 6-8), which are bolted to the sides of the stator 113 with small attachment wedges 145 (described below, and depicted in FIG. 8) to create a solid mating structure.

Figure 6:
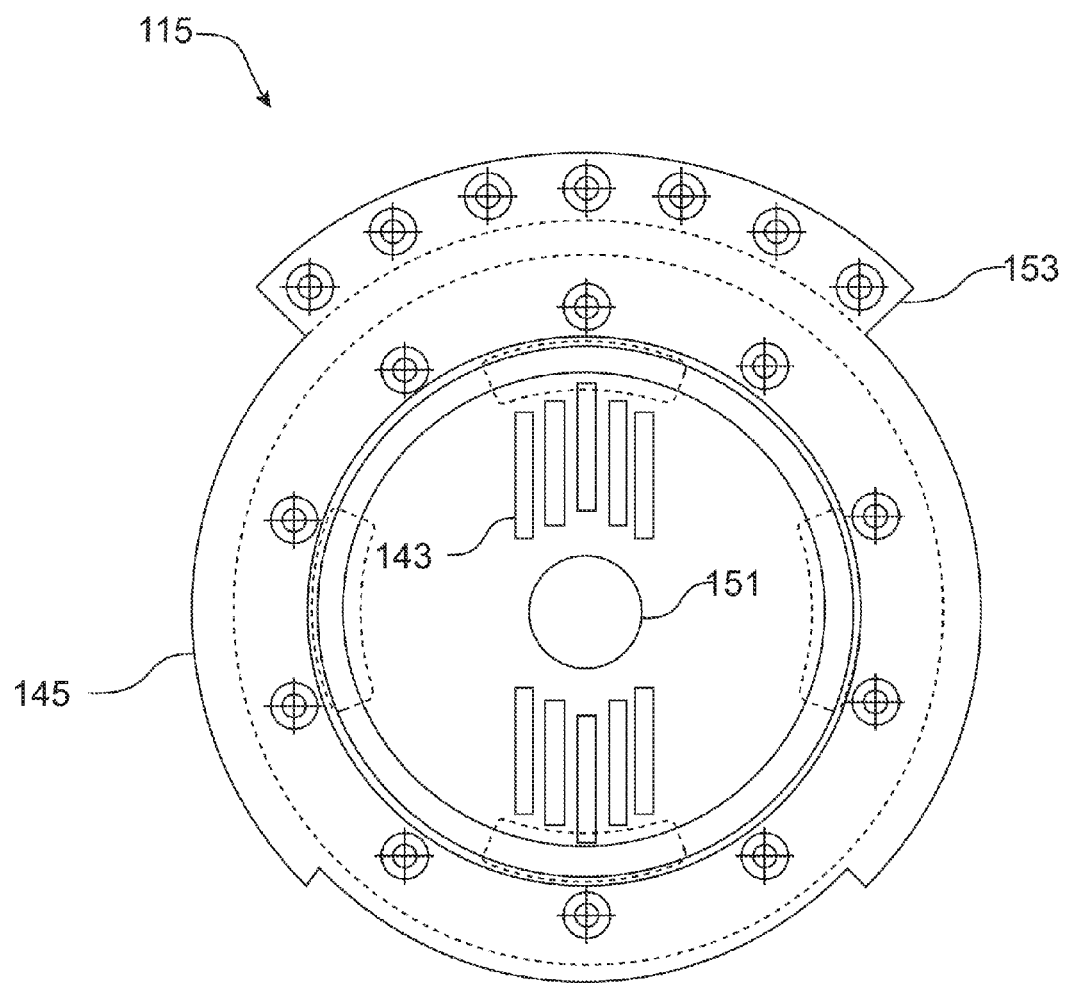
FIG. 6 is a front view of the internal stator support plate on the right end of the CPE of FIGS. 1-2 (the internal stator support plate on the left end of the CPE is a mirror image). The stator support plate is attached to the stator using shallow wedges to solidify the rigidity of the joined components. This internal plate also provides an attachment lug for use with the referenced link for the actuator in the system. Finally, this internal plate provides a machined surface for the associated principal bearing on either side of the CPE.
Figure 7:
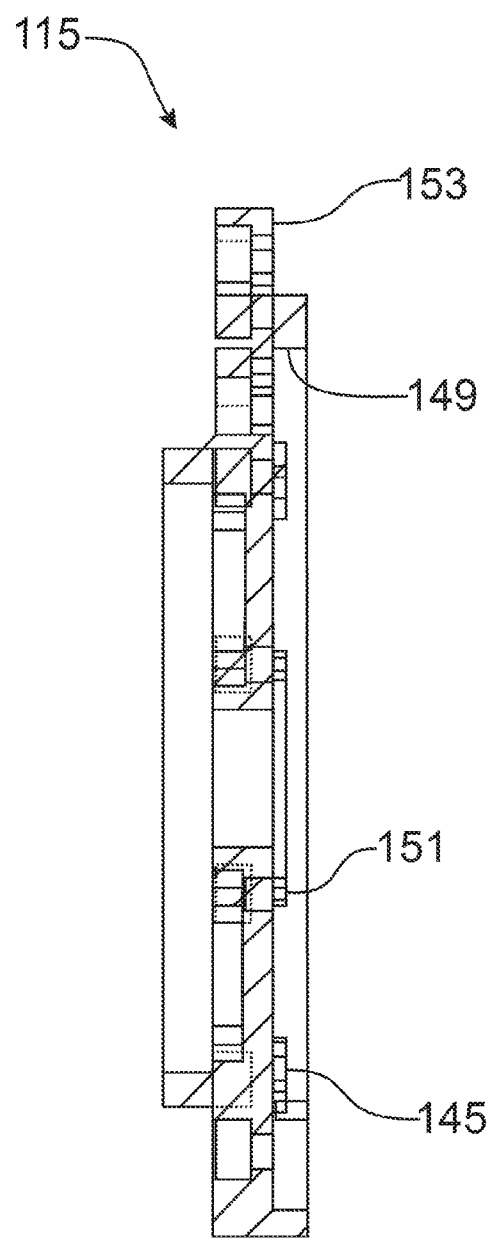
FIG. 7 is a side view of the right end internal plate of FIG. 6.
Figure 8:
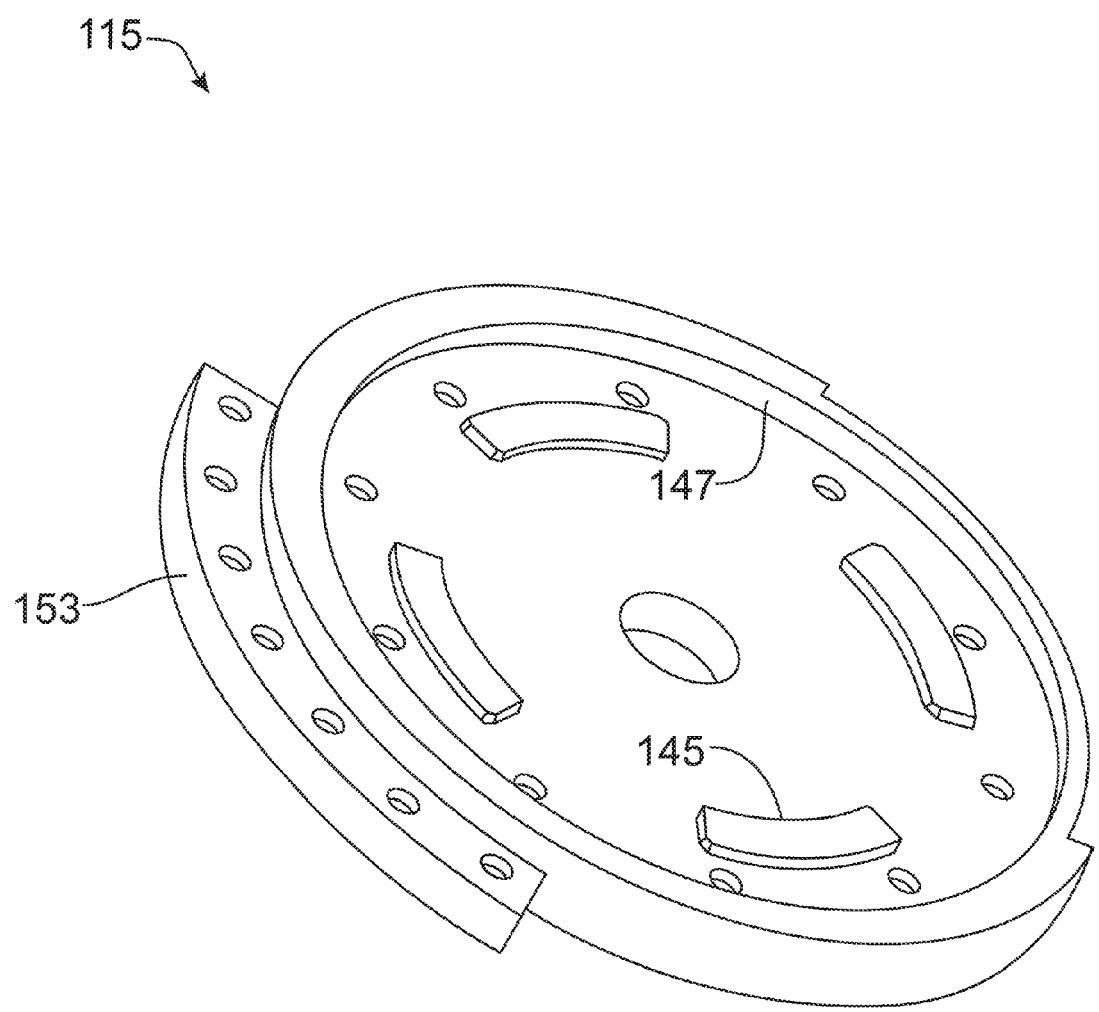
FIG. 8 is a perspective view of the right end internal plate of FIG. 6.
Figure 9:
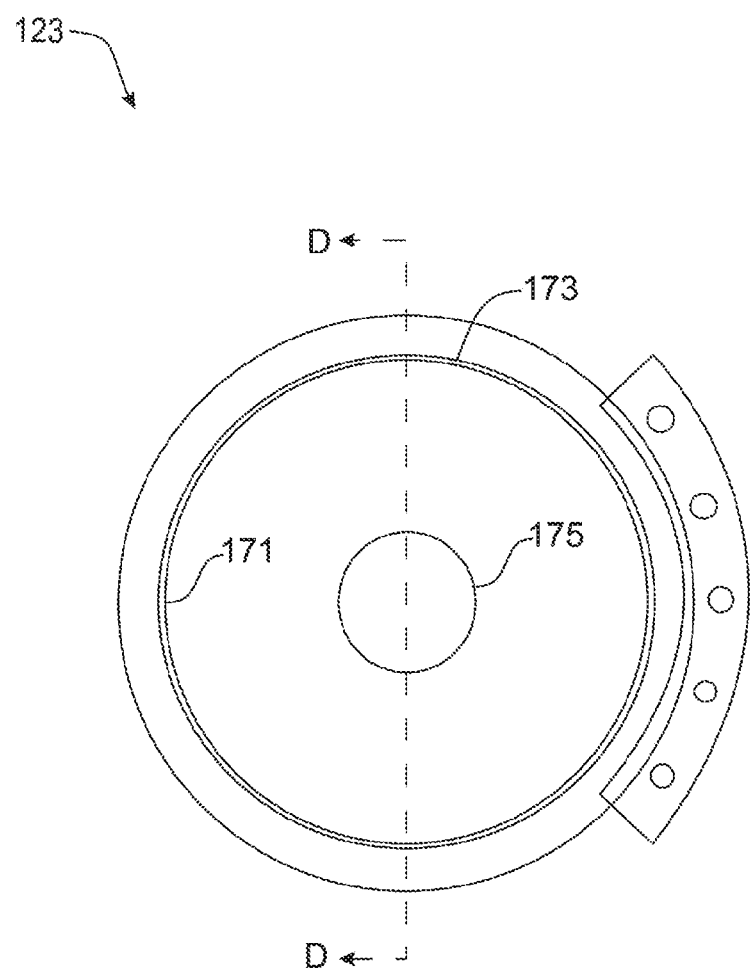
FIG. 9 is a front view of the right output plate/internal gear combination of the CPE of FIGS. 1-2 (the left output plate is a mirror image). This combination is an exceptionally rugged design which provides a lug attachment for the yoke output link for the actuator. The yoke contributes to the overall rigidity of the actuator. The output plate contains the internal gear (with circular arc teeth) to mesh with the external parallel eccentric gear. Finally, the output plate provides a machined surface for the principal bearing between the internal and the output plate.
Figure 10:
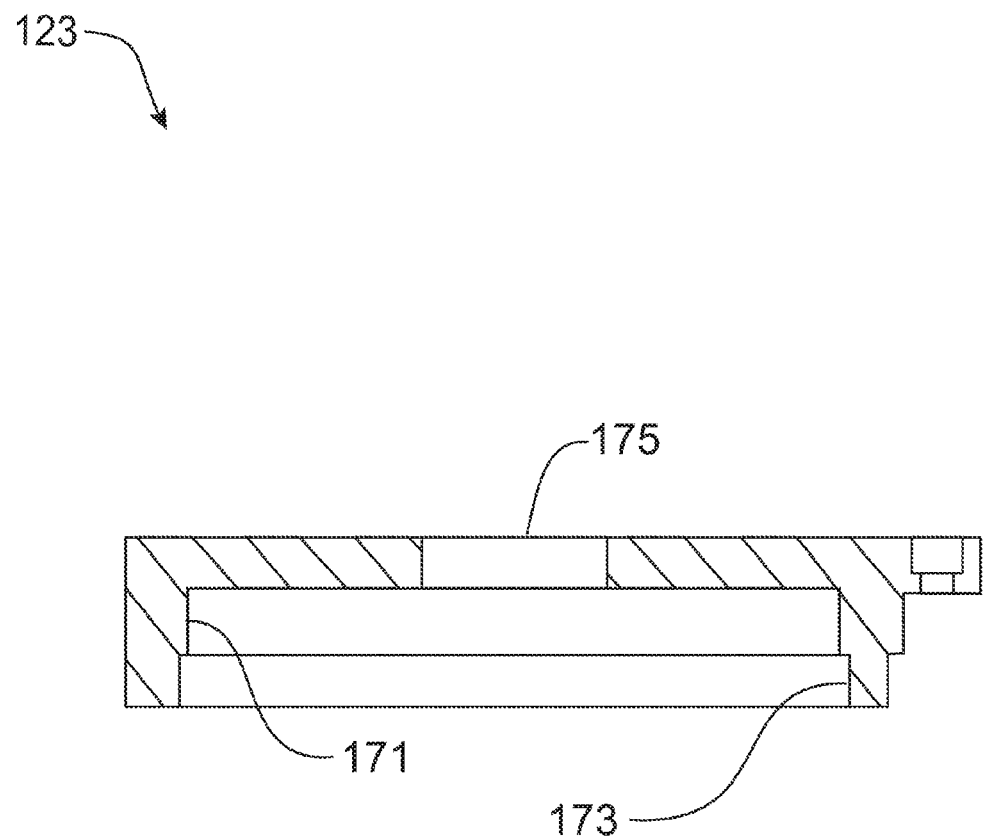
FIG. 10 is a cross-sectional view, taken in a plane containing the longitudinal axis of the crankshaft, of the right output plate of FIG. 9.
Figure 11:
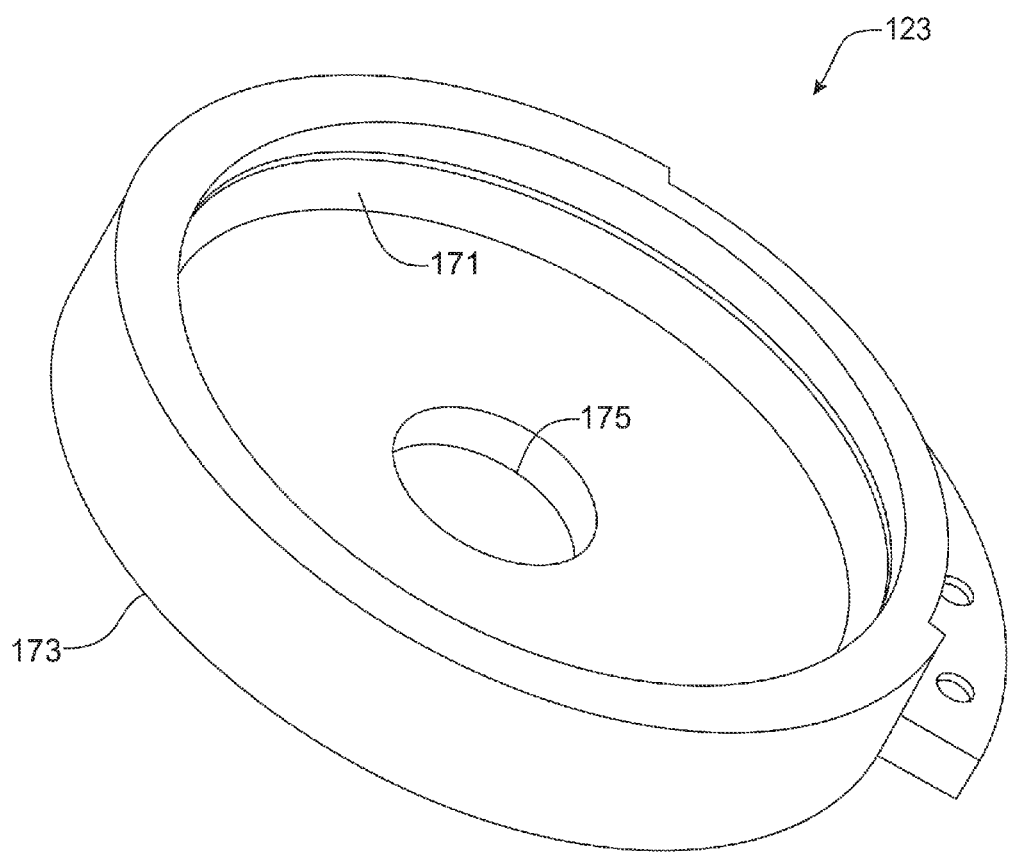
FIG. 11 is an isometric view of the right output plate of FIG. 9.

FIGS. 6-8 depict the stator support plates 115 in greater detail. As seen therein, each stator support plate 115 is equipped with a central opening 141 for the crankshaft 103 (see FIG. 1). As seen in FIG. 6, a first major surface of each stator support plate 115 is equipped with a plurality of spline grooves 143. As seen in FIG. 8, a second major surface of each stator support plate 115 is equipped with a plurality of stator attachment wedges 145, and has a bearing support structure 147 disposed thereon. As seen in FIG. 7, each stator support plate 115 is further equipped with a stator interface 149, attachment thru bolt holes 151, and a link lug attachment 153. One surface of the perforated link lug attachment 153 is depicted in FIG. 8.

Figure 4:
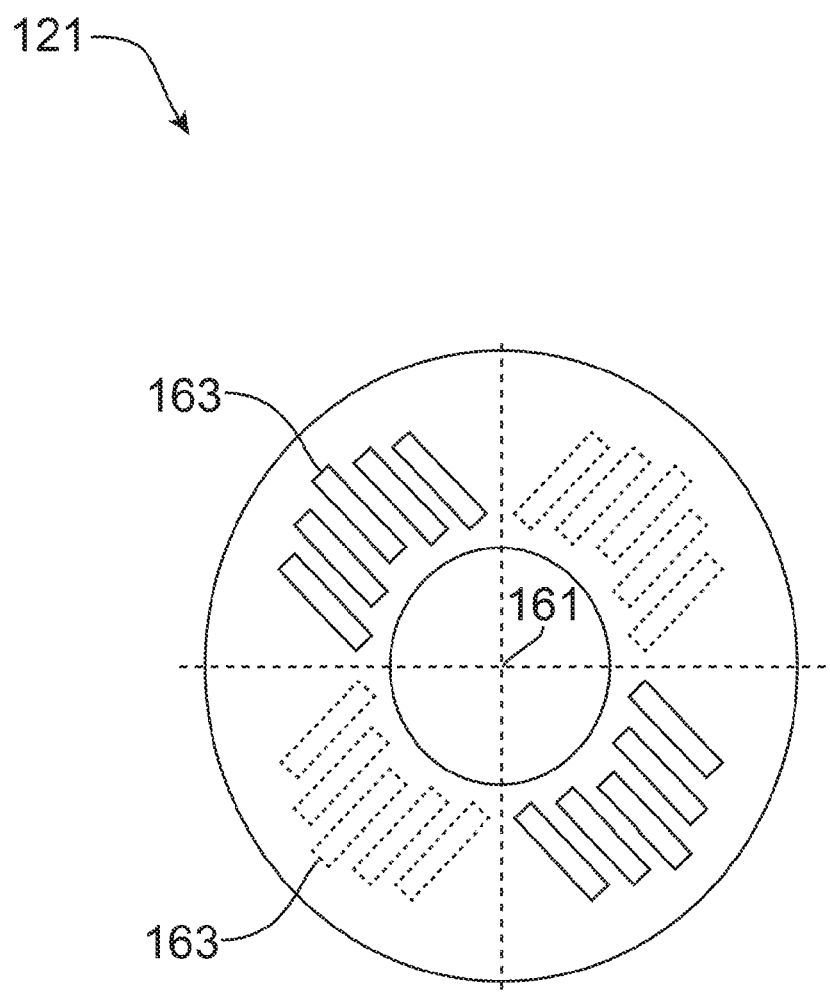
FIG. 4 is a front view of the crosslink in the Oldham couplings in the CPE of FIGS. 1-2. The particular, non-limiting embodiment of the crosslink depicted features five parallel tongues (in two lengths) on either side of a flat plate to provide a very high contact area to resist torque loads and shocks.

FIG. 4 depicts the crosslinks 117 in greater detail. As seen therein, each crosslink 117 is equipped with a central crankshaft opening 161, and has first and second opposing and generally planar major surfaces with first and second sets of tongues 163 (for splines) disposed thereon.

Figure 5:
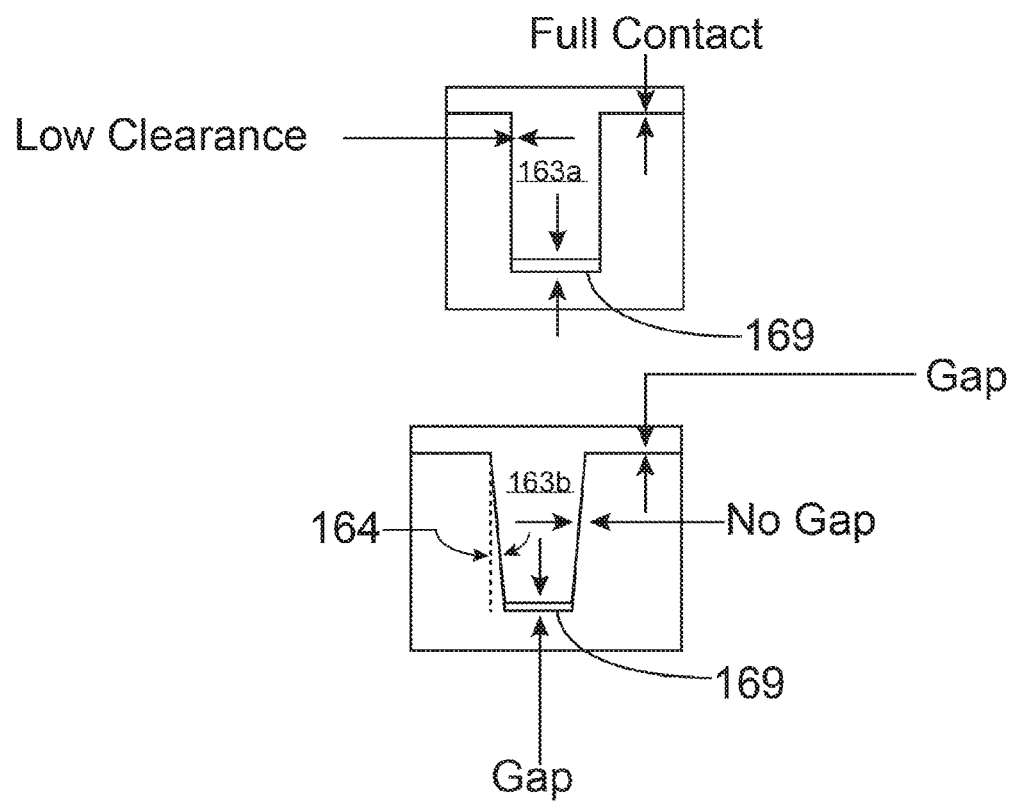
FIG. 5 depicts cross-sectional illustrations of two alternate spline configurations for the crosslink of FIG. 4. In the first spline configuration, the tongues are parallel sided (with some backlash), while in the second spline configuration, the tongues are slightly tapered and preloaded (to remove back lash, if desired).

FIG. 5 depicts cross-sectional illustrations of two alternate spline configurations for the crosslink of FIG. 4. In the first spline configuration, the tongues 163*a* are parallel sided (with some backlash) and mesh with a complimentary shaped slots 169*a*, while in the second spline configuration, the tongues 163*b* are slightly tapered at a taper angle α 164 and preloaded (to remove back lash, if desired).

Figure 12:
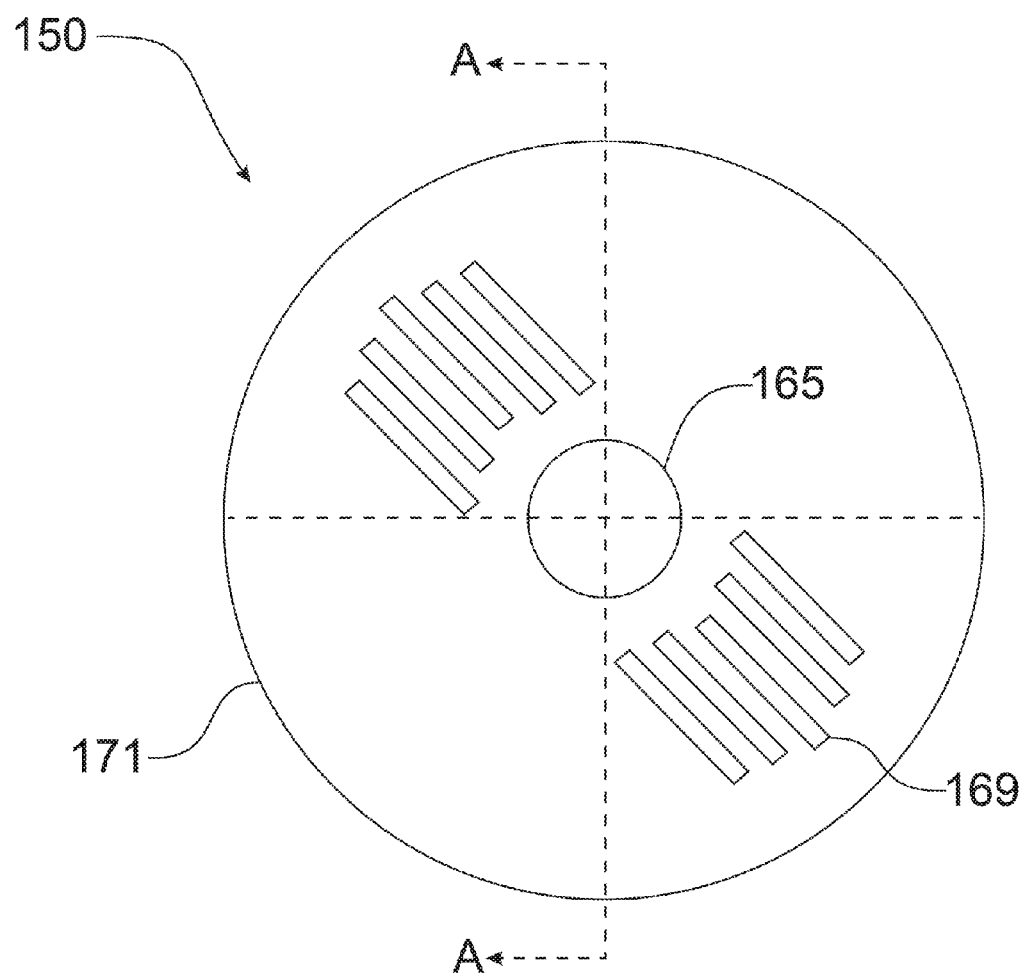
FIG. 12 is a front view of an eccentric parallel gear of the CPE of FIGS. 1-2. Each of the external parallel eccentric gears contains circular arc gear teeth and has on its interior face perhaps five grooves (in two sections) to mesh with mating tongues on the crosslinks to prevent its rotation. The dual parallel eccentric gears are driven to oscillate by a crankshaft eccentric, preferably using a needle bearing.
Figure 13:
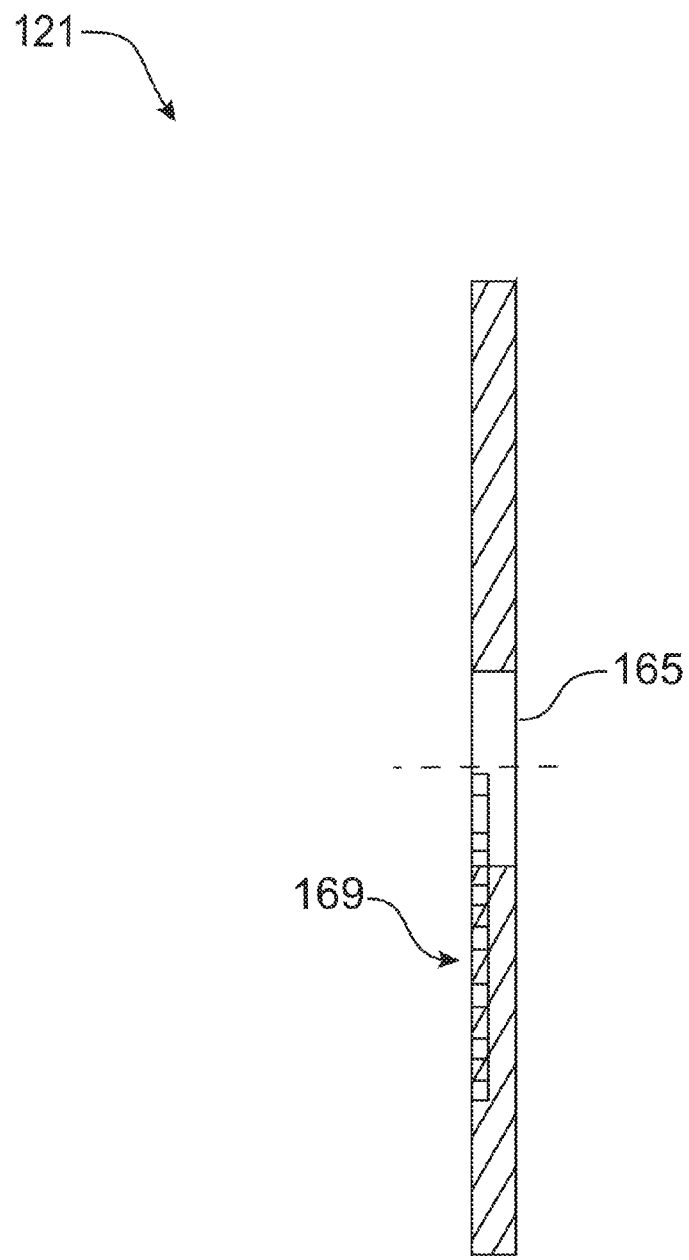
FIG. 13 is a cross-sectional view, taken along LINE 13-13 in a plane containing the axis of the crankshaft, of the parallel eccentric gear of FIG. 12.
Figure 14:
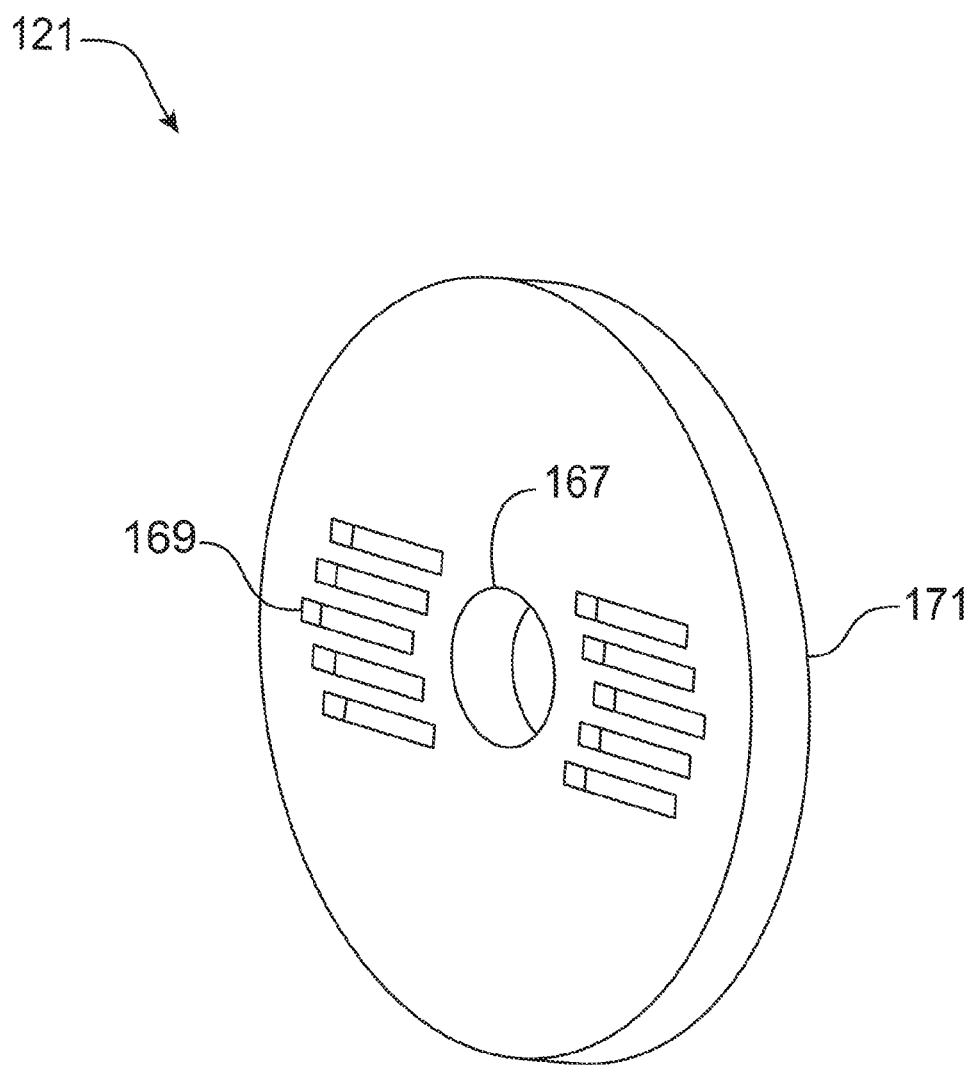
FIG. 14 is a perspective view of the parallel eccentric gear of FIG. 12.

FIGS. 12-14 depict the eccentric gears 121 in greater detail. As seen therein, each eccentric gear 121 is equipped with a central crankshaft opening 165 having a bearing and bearing support structure 167 disposed thereon, and has first and second opposing and generally planar major surfaces. The first major surface has a plurality of spline grooves 169 or slots disposed thereon. The outer peripheral surface of the eccentric gear 121 is equipped with a plurality of gear teeth 171.

As noted above, each crosslink 117 engages adjacent surfaces of the eccentric gear 121 and the internal stator support plate 115 across the tongue and groove surface 119. In the preferred embodiment, this is achieved through the provision of the multiple spline grooves 143 (see FIG. 6) on the internal support plates 115 as described above, which mesh with the first and second sets of complimentary shaped tongues 163 (see FIG. 4) disposed on the first and second major surfaces of the crosslinks 117. The crosslinks 117, in turn, mesh with the respective parallel eccentric gears 121 to form a version of an Oldham coupling. In particular, the tongues 163 on the crosslinks 117 (see FIG. 4) mesh with corresponding spline grooves 169 (see FIG. 12) on the parallel eccentric gears 121. This coupling permits the eccentric gears 121 (see FIGS. 12-14) and cross links 117 (see FIG. 4) to oscillate without undergoing rotation.

Figure 15:
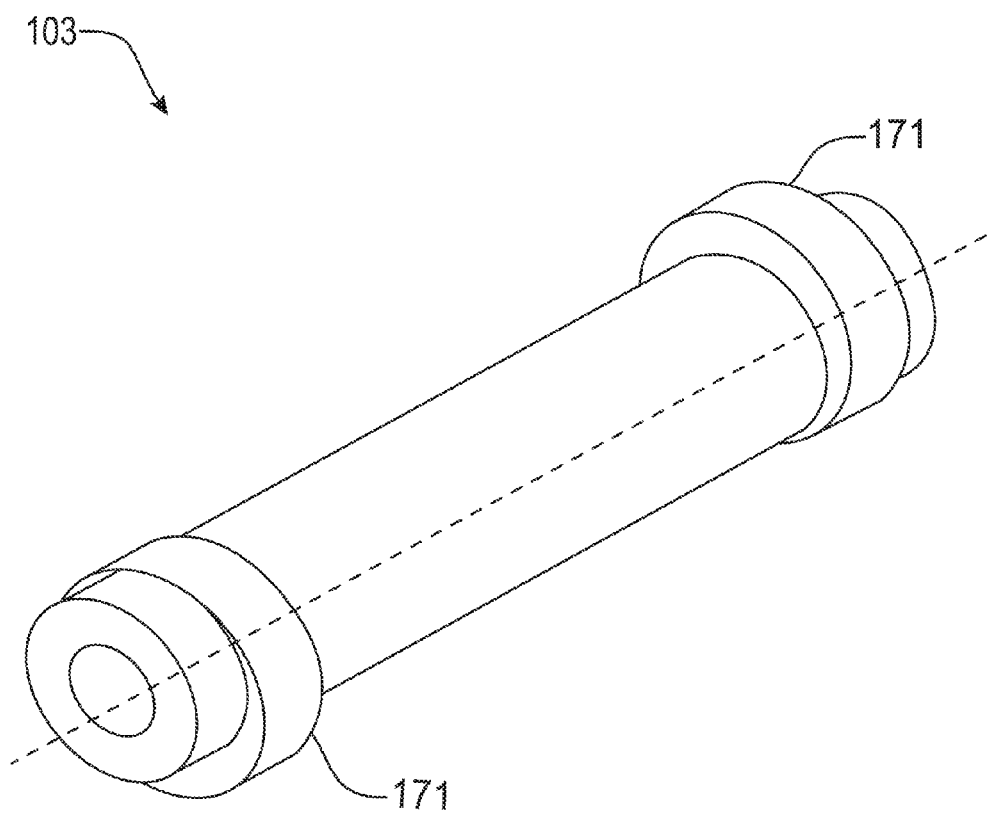
FIG. 15 is a perspective view of the crankshaft 103 of the CPE 101 of FIGs. As seen therein, the crankshaft 103, which is driven by the rotor 109 (see FIG. 1), is equipped with two eccentrics 107 which drive the oscillating parallel eccentric gears 121. Each end of the crankshaft 103 is supported by shaft bearings 135 (see FIG. 1) in the end plates 123 of the actuator 101.

As noted above with respect to FIGS. 1-3, the crankshaft 103 is driven by the rotor 109. As seen in FIG. 15, the crankshaft 103 contains two eccentrics 171 which (as may be appreciated from FIGS. 2-3) drive the two parallel eccentric gears 121 in oscillation while also driving the crosslinks 117 in oscillation without rotation.

Each crosslink 117 on either side of the prime mover preferably contains an oil pressure pump to automatically lubricate (due to its oscillation) the multiple tongue and groove meshes. Each parallel eccentric (external) gear 121 meshes with an internal gear (in hypocyclic motion) machined into the inner rim of the reference ring gear (see FIG. 5) of the dual gear system. The two output plates 123 also contain the bearings to support the crankshaft 103 which carries the (needle) bearings to drive the eccentric gears.

Figure 16:
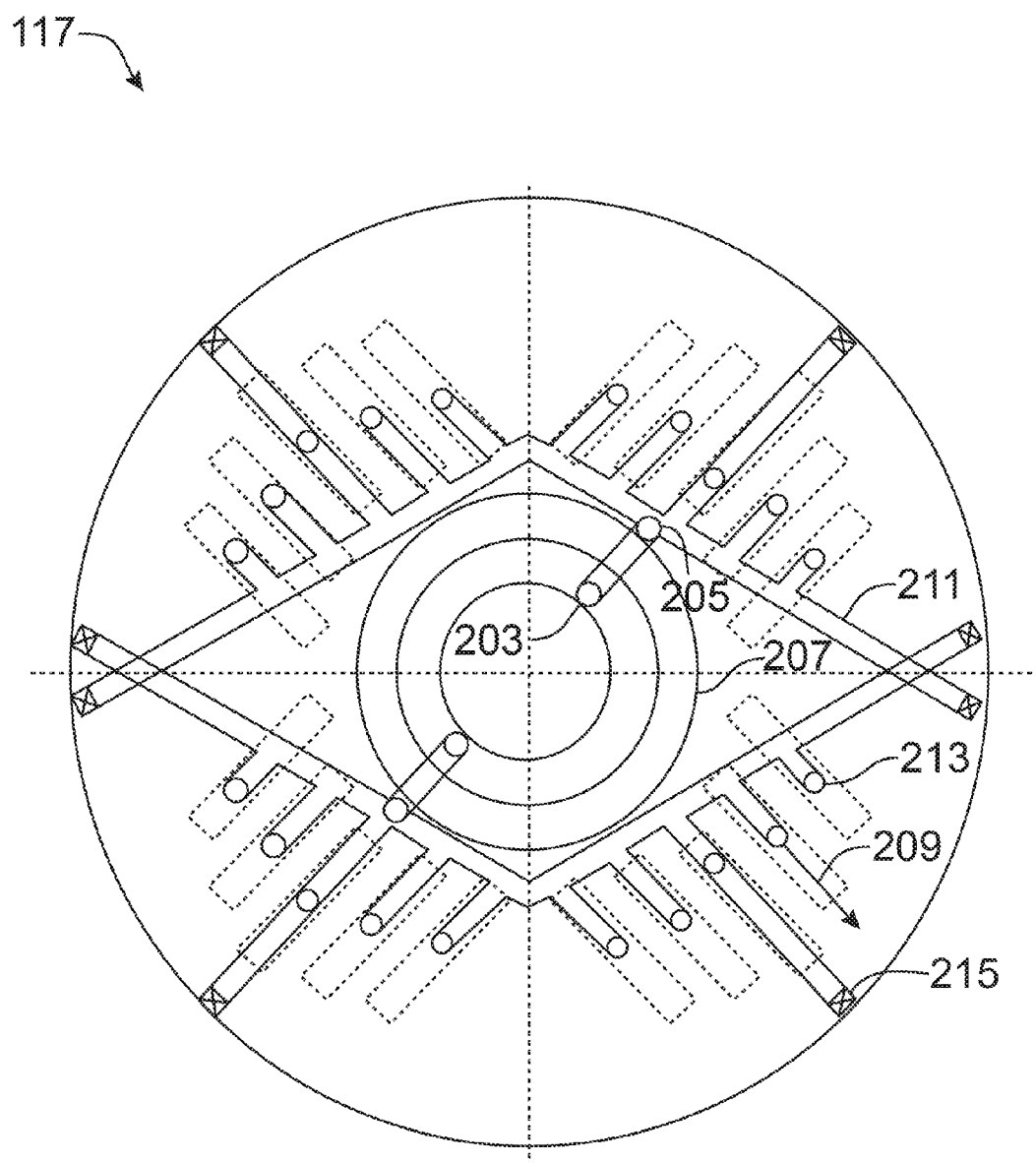
FIG. 16 is a front view, partially in section taken along a plane perpendicular to the longitudinal axis of the crankshaft, of a crankshaft journal driven oil pump suitable for use in the oscillating cross link of FIG. 4. The figure shows the components of the oil pressure pump in the oscillating cross link which enables the lubrication of each tongue and groove mesh. This system is completely passive and requires standard inlet and outlet check valves to enable pressurization of the oil in a volume driven by the motion of the cross links relative to the pump collar centered on the stationary (but rotating) crankshaft.

FIG. 16 is a front view, partially in section taken along a plane perpendicular to the longitudinal axis of the crankshaft, of a crankshaft journal driven oil pump 201 suitable for use in an oscillating cross link 117 of the type depicted in FIG. 4. The direction of oscillation is indicated by arrow 209. The figure shows the components of the oil pressure pump 201 (along with some preferred, but non-limiting, dimensions) in the oscillating crosslink 117 which enables the lubrication of each tongue and groove mesh. This system is completely passive and requires standard inlet 203 and outlet check valves 205 to enable pressurization of the oil in a volume driven by the motion of the crosslink 117 relative to the pump collar 207 centered on the stationary (but rotating) crankshaft 103. The oil pump 201 further comprises oil channels 211, spline oil ports 213, and plugs 215 as indicated.

Figure 17:
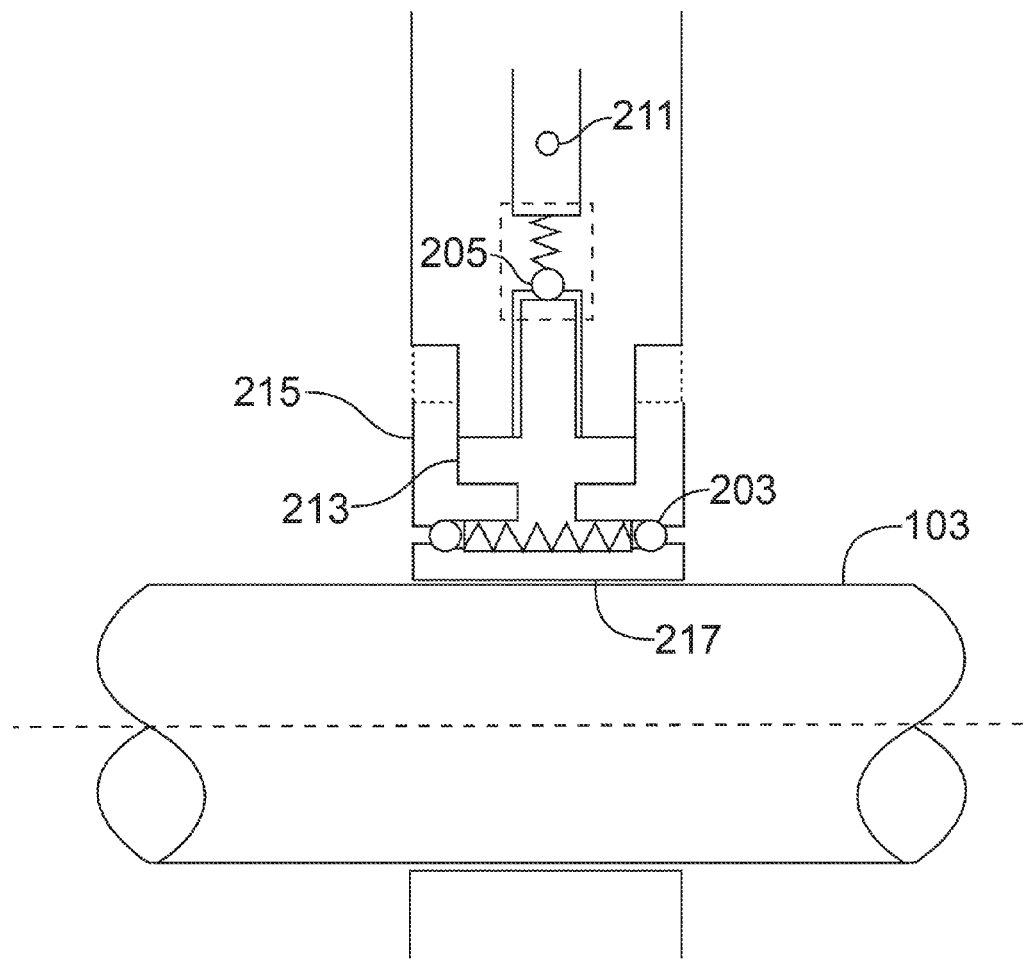
FIG. 17 is a cross-sectional view of the journal oil pump of FIG. 16.

FIG. 17 is a cross-sectional view of a portion of the journal oil pump of FIG. 16 taken in the region of the crankshaft 103, and in a plane perpendicular to the major surfaces of the crosslink 117. As seen therein, each oil channel 211 terminates in a check valve 205 which opens to an eccentric crescent volume 213 adjacent to a pump collar 215 and an inlet valve 203. The inlet valve 203 is disposed adjacent to a journal bearing 217.

Figure 18:
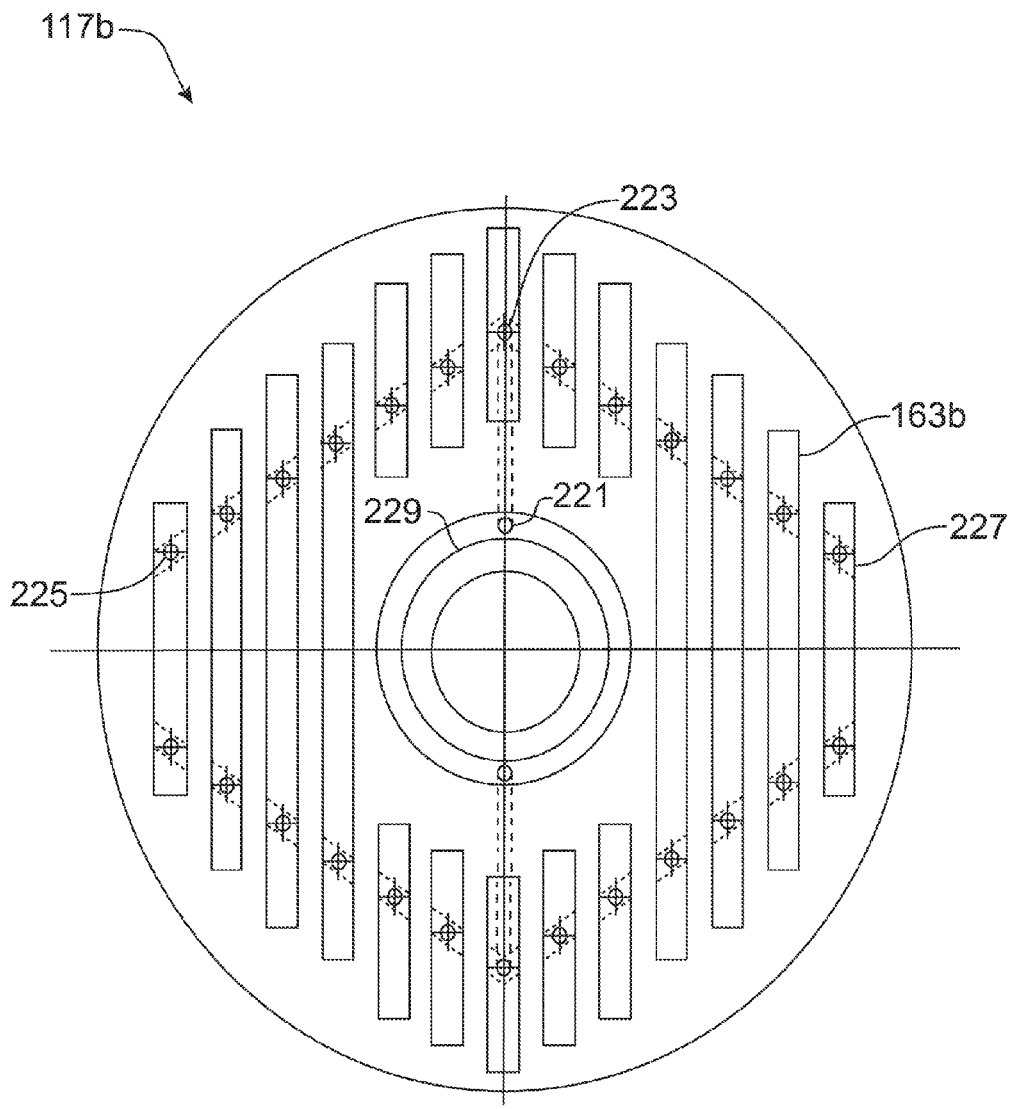
FIG. 18 is a front view, partially in section taken along a plane perpendicular to the longitudinal axis of the crankshaft, of a maximum load/stiffness capacity crosslink suitable for use in the oscillating cross link of FIG. 4. This particular embodiment depicts a generalized concept of tongue and grooves with 2 oil pumps providing pressurized oil to a continuous cross channel machined in the base of the tongues on the cross link and the top of the grooved face link mating surface.
Figure 19:
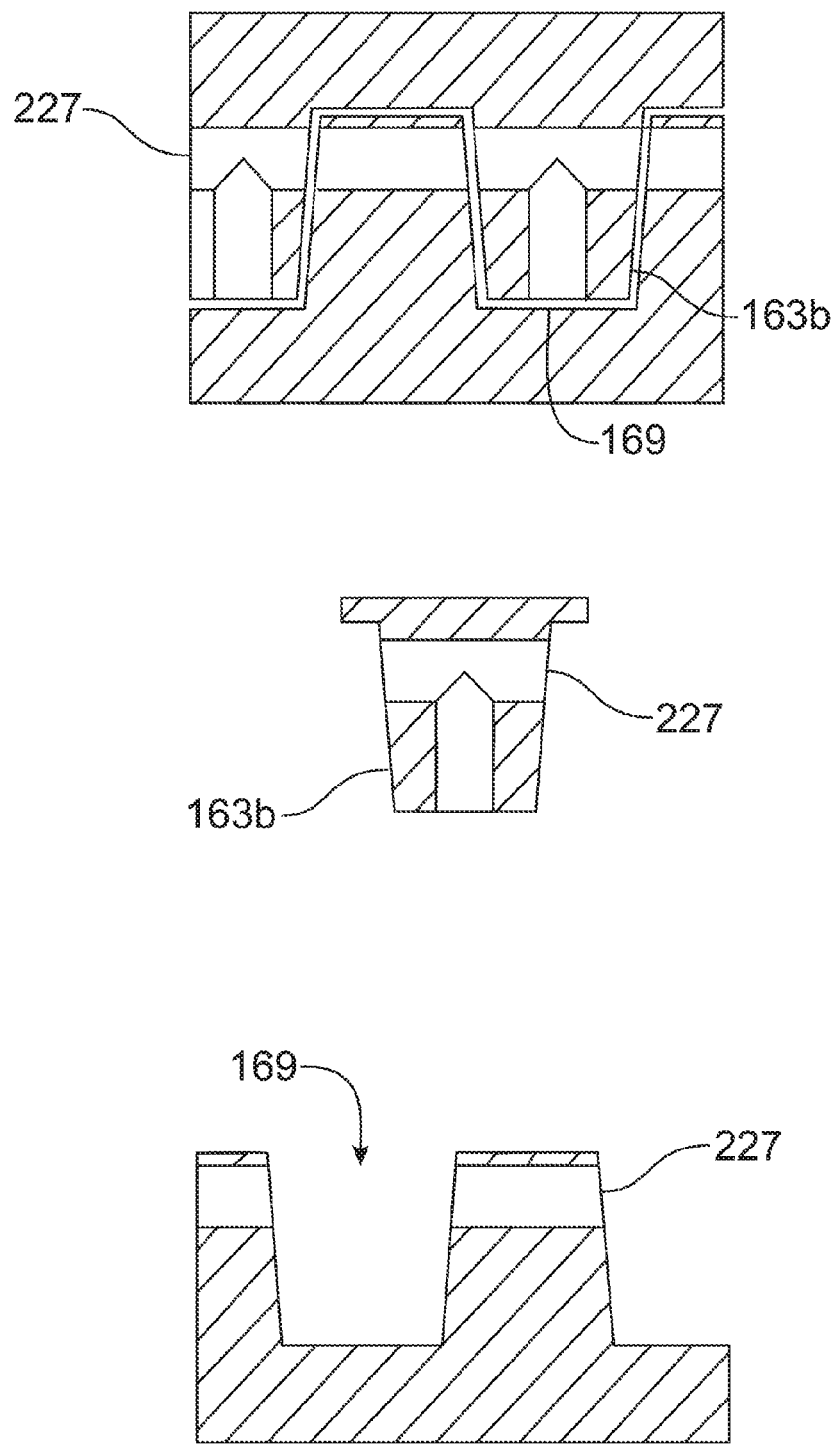
FIG. 19 is a series of cross-sectional views illustrating the tongue and groove configuration of the crosslink of FIG. 18.
Figure 20:
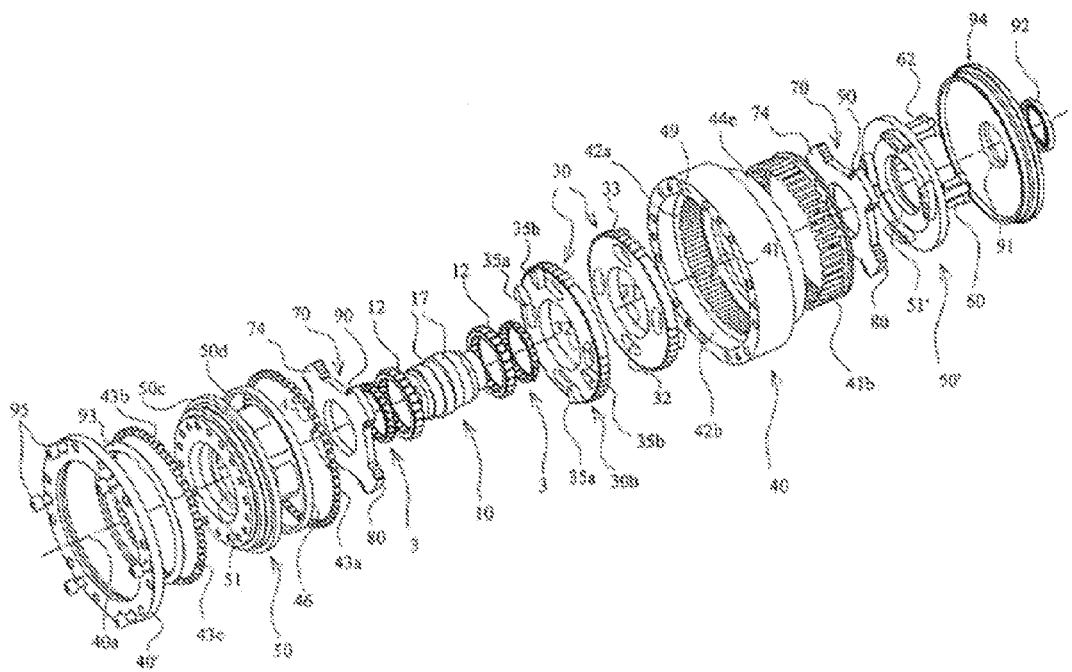
FIG. 20 is an exploded view of a prior art Twin Spin Spinea gear train.
Figure 21:
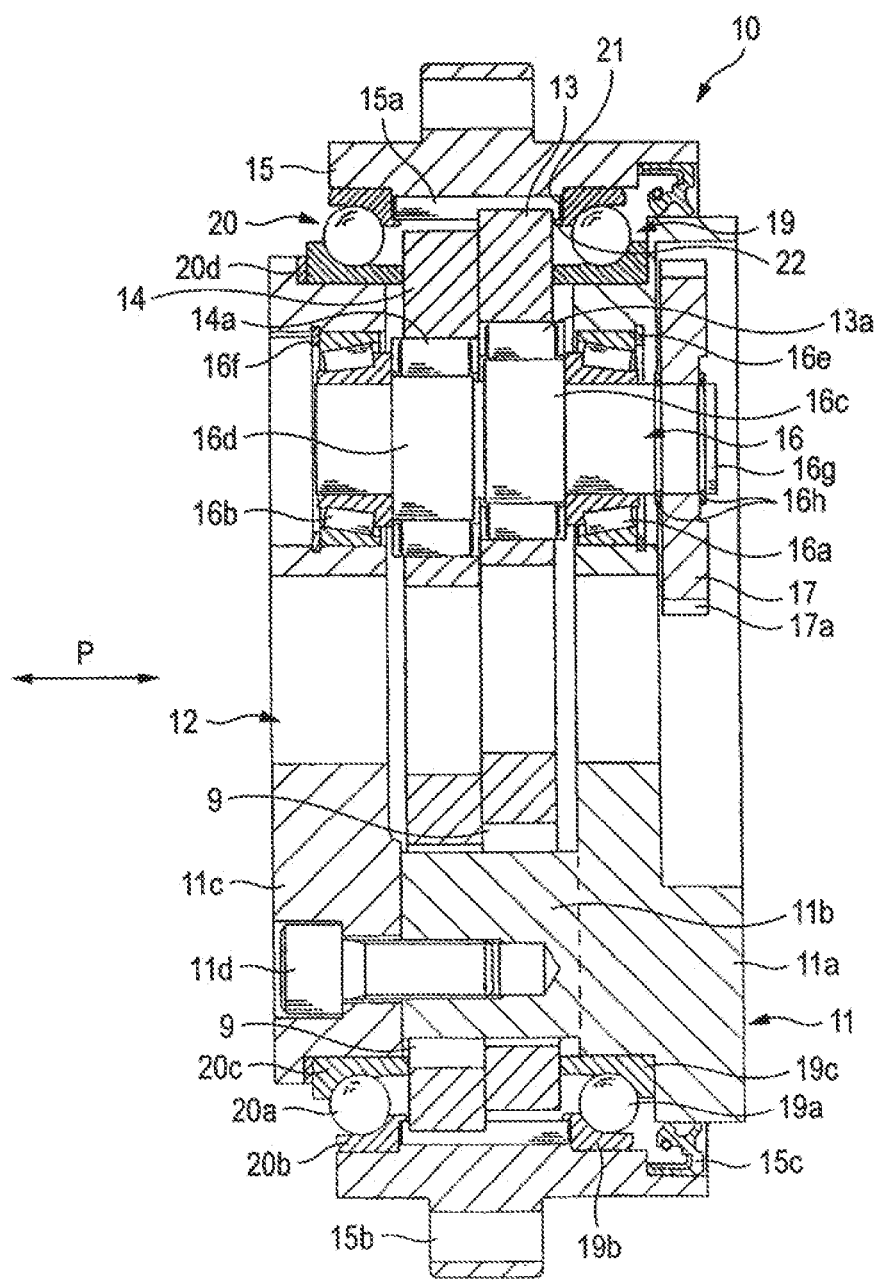
FIG. 21-23 are illustrations of a prior art Nabtesco gear train.
Figure 22:
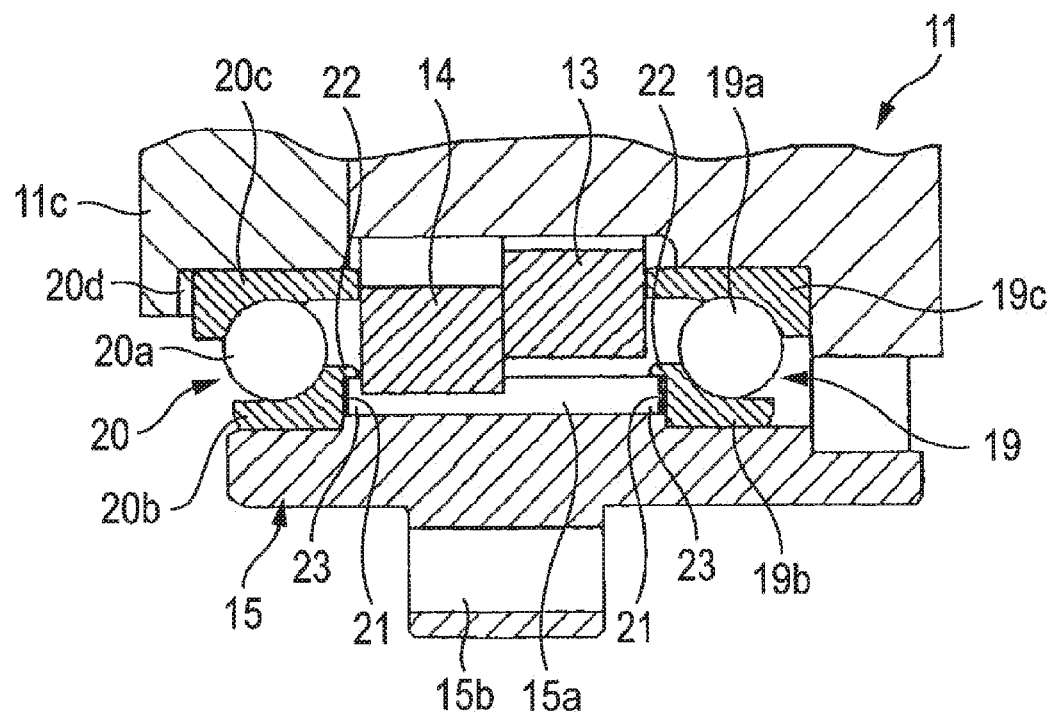
Figure 23:
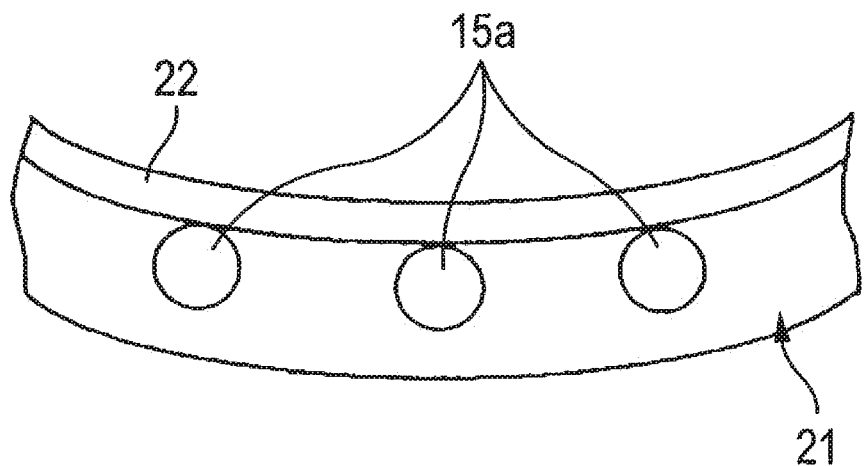

FIG. 18 is a front view, partially in section taken along a plane perpendicular to the longitudinal axis of the crankshaft, of a maximum load/stiffness capacity crosslink 117*b* suitable for use in the oscillating cross link of FIG. 4. This particular embodiment depicts a generalized concept of tongue and grooves with 2 oil pumps 221 providing pressurized oil to a continuous cross channel machined in the base of the tongues 163*b* on the crosslink 117*b* and the top of the grooved face link mating surface. The crosslink 117b further includes first and second supply ports 223, a groove supply port 225, a tongue channel 227, and a crankshaft collar 229. The tongue and groove configuration of the crosslink of FIG. 18 is depicted in the series of cross-sectional views of FIG. 19.

One key feature of the preferred embodiment of the CPE disclosed herein is that it uses two widely separated principal bearings set in machined surfaces in the output plate and the internal plate attached to the stator. This forms an exceptionally stiff/rugged shortest force path which permits the absolute minimum deformation between the output plate and the stiff stator. In FIGS. 1-3, it is seen that the output plates are held in an output yoke link while the stator/internal plates are held by a preferably rugged reference link. The resulting assembly may thus be made to be exceptionally stiff, effectively very light, and resistant to high shock.

It is referred that torque shocks be absorbed by the crosslinks between the output plates and the internal plates attached to the stiff stator. In the embodiments described above, multiple parallel tongue/groove meshes are utilized to provide exceptional stiffness as a result of the high contact surface area. As described above, this mesh may be lubricated by oil pumps in each cross link to reduce friction.

Rolling elements are preferably not in the CPE disclosed herein because of their compliance, lower shock capacity, cost, and high space demand. As described herein, the tongue/groove may be tapered, which would permit preloading from the end plates of the CPE. Overall, the CPE will typically not be as efficient as the MPE, but it will typically be much more efficient than the cycloidal drives by Nabtesco and Spinea which are referenced herein.

It is noted that the tongues preferably oscillate in their grooves with relatively short strokes, which may further reduce friction losses. Also, the crankshaft bearings experience low radial force loads (perhaps 10× less than in the aforementioned Nabtesco and Spinea devices) to further reduce friction losses and internal deformation and wear. The design may thus be constructed with virtually no high deformation or highly stressed components/contacts, which in turn enables a more compact design of lower weight—i.e., high torque density. Along these lines, the MPE typically requires the use of through cross bridges to tie the gear train together. The CPE does not require that structural feature, thus eliminating the need for bridge holes in the cross links and the eccentric gears, and making them more rigid and less expensive to produce.

The CPE may be designed for a yoke attachment configuration permitting a rotation of about ±120°. The yoke ties the two output plates together while the reference link is tied directly to the rugged stator to maximize stiffness. Between these two links are two widely spaced bearings (preferably tapered roller or cross roller bearings) in a very short force path to maximize stiffness. The CPE may be either coffee can or pancake in its shape. The pancake version may use a large hole in the crankshaft to enhance torque density and overall output stiffness. Here, it is to be noted that the crankshaft may be sealed where it passes through the internal plates attached to the stator. This will typically reduce oil windage losses in the prime mover. The widely spaced cross link/eccentric gears may require balancing masses to reduce an inertia twisting moment perpendicular to the crankshaft. These may be attached (or mass removed) to the crankshaft itself.

The CPE gear ratio range (20 to 1 up to 150 to 1) may be similar to that of the MPE without a reducing front end. This range should be entirely suitable for the lower output speeds required in heavy machine applications. Durability under shock is typically a key objective in these applications. The aforementioned Nabtesco and Spinea devices have rolling elements (bearings and sliding grooves) under essentially the full shock load on the gear train. In the preferred embodiment of the CPE, no rolling elements outside of the principal bearings face these shocks. In a typical embodiment of the Nabtesco device, 14 bearings face these shocks, while in the preferred embodiment of the CPE, only two large diameter bearings do. In the Spinea device, the rolling elements in the grooves do, while in the preferred embodiment of the CPE, multiple lightly loaded and shock resistant tongue/groove surfaces do. The MPE will typically be somewhat more efficient and higher speed than the CPE, and both may be used in distinct domains for which their core characteristics are best suited.

The following are some key technical features of the preferred embodiment of the CPE disclosed herein relative to the MPE. Both CPE and MPE exceed the performance of the aforementioned Nabtesco and the Spinea cycloidal drives. The MPE typically does very well as a versatile joint actuator of high durability, torque density, and efficiency. The CPE typically excels in shock resistance, a reasonable efficiency, and a very high torque density. The following are some key features of the preferred embodiment of the CPE that should be considered, especially for high shock duty cycles.

One of the unique features of the preferred embodiment of the CPE disclosed herein is that the prime mover of the CPE is centered between two non-rotating cross link/eccentric gears (to create an Oldham coupling) to form an exceptionally rigid lighter weight actuator with high resistance to shock, as might be found in construction machinery. The goal is to compete directly with hydraulics with the attributes of long durability, improved responsiveness, and low maintenance.

The CPE typically offers significant advantages in terms of ruggedness over many other rotary actuators. In particular, in a preferred embodiment, the CPE uses two widely spaced principal bearings in a very short force path adjoining the rugged stator which provides the structural backbone of the actuator. No other rolling element bearings are in the force path. Also, the multiple sliding surfaces of the Oldham coupling are preferably very stiff and shock resistant.

The preferred embodiment of the CPE disclosed herein also preferably features an advantageous stator attachment which imparts several benefits to the rotary actuator. Thus, in a preferred embodiment of the CPE disclosed herein, the stator serves as the CPE's structural anchor. The internal plate (as one side of the Oldham coupling) uses shallow wedges inset into the stator with an overlapping ring over the stator to form a very rigid combination to obtain the maximum benefit from the stator's rigidity.

The preferred embodiment of the CPE disclosed herein also preferably offers improvements in torque density. The exceptional stiffness of the symmetric CPE means that it is lighter than the MPE. This stiffness also represents an improvement over the rotary actuators developed by Nabtesco and the Spinea, primarily because these latter actuators have compliant rolling element bearings in the force path.

In the preferred embodiment of the CPE disclosed herein, all small diameter/high velocity bearings on the crankshaft of the CPE are preferably out of the force path (as they are in the MPE). This is advantageous in that rolling element bearings are relatively compliant and typically cannot resist high levels of shock without damage (indentations) to their races. By contrast, in the Nabtesco and Spinea devices, these bearings are in the force path. Thus, the device of Nabtesco uses twelve such bearings on three crankshafts, and the device of Spinea has loaded crankshaft bearings and rolling elements in its Oldham splines. Moreover, in their preferred embodiments, the actuators disclosed herein use large diameter widely spaced rolling element bearings that are designed to resist shock in all directions as joints in active machines (say, in robot manipulator joints).

The preferred embodiment of the CPE disclosed herein also preferably utilizes a gear teeth mesh preload. This mesh features soft bearings on the crankshaft which deform under small closing interference.

The preferred embodiment of the CPE disclosed herein also preferably provides drastic reductions in output effective inertia, and thus provide high responsiveness.

The preferred embodiment of the CPE disclosed herein is also preferably characterized by low internal sliding velocities, less friction losses and higher efficiency.

The preferred embodiment of the CPE disclosed herein is also preferably characterized by low internal deformations. This may be achieved through use of an unloaded crankshaft, concave/convex tooth contacts, short teeth, the use of up to 10 teeth in 2 meshes, the use of flat surfaces on tongues and grooves, and the avoidance of rolling element bearings within the force path.

The preferred embodiment of the CPE disclosed herein is also preferably characterized by low contact stresses. This may be achieved through use of concave/convex teeth contacts and flat tongue/groove surfaces. Low contact stresses permits higher loads, increases torque density and reduces weight.

The preferred embodiment of the CPE disclosed herein is also preferably characterized by high shock resistance and ruggedness. This may be achieved through the use of up to 10 teeth in contact, the use of flat surfaces on tongues and grooves, the avoidance of rolling element bearings within the force path, and the use of a crankshaft which is protected by low pressure angles that are not in the load path.

The preferred embodiment of the CPE disclosed herein is preferably further characterized by simplicity. In particular, it utilizes only one lightly loaded crankshaft and minimum rolling element bearings, none of which are in the force path.

The preferred embodiment of the CPE disclosed herein preferably utilizes preloaded tongues and grooves. The tongues and grooves are preferably tapered, simple and durable, and may take the form of flat springs.

The preferred embodiment of the CPE disclosed herein is also preferably characterized by high accuracy under load. This may be achieved by high stiffness throughout the CPE, low lost motion, low internal deformations, and the use of dual drivers operated 180° out-of-phase to cancel any inherent machining errors.

The preferred embodiment of the CPE disclosed herein is also preferably characterized by low tooth pressure angles. This avoids the transfer of active tooth loads to the crankshaft, leaves the crankshaft out of the force path, and reduces noise arising from slow pick-up and the release of loads on the teeth.

The preferred embodiment of the CPE disclosed herein is also preferably characterized by improved durability. This may be achieved through reduced roller element bearings, keeping bearings out of the load or force path, the use of low sliding velocities in tongue and groove interfaces, and no tooth sliding velocity.

The preferred embodiment of the CPE disclosed herein is further preferably characterized by tooth effective force moments. This may be achieved through the use of large diameters in the output tooth mesh, which may be as much as 80% of the full output gear radius. This larger radius reduces local gear tooth loads.

The preferred embodiment of the CPE disclosed herein is also preferably characterized by volume reduction. This may be achieved through the use of larger rolling element bearings, the use of needle bearings, and the elimination of bearings in the force path. Such volume reduction results in lower weight (since weight is approximately a cubic function of the basic size of the gear train) and improved torque density.

The preferred embodiment of the CPE disclosed herein is also preferably equipped with dual principle bearings having the largest possible diameter. These bearings, which connect ridged end plates, effectively resist out-of-plane forces and moments, enables the actuator to serve as a joint in a host device, and may be essential for serial manipulators, active suspensions and vehicle rim wheels.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

It will also be appreciated that the various features set forth in the claims may be presented in various combinations and sub-combinations in future claims without departing from the scope of the invention. In particular, the present disclosure expressly contemplates any such combination or sub-combination that is not known to the prior art, as if such combinations or sub-combinations were expressly written out. By way of example, absent some teaching otherwise, it is expressly contemplated that any features disclosed in two or more dependent claims may be in the following claims listing may be combined together into the same claim without departing from the scope of the teachings herein.

What is claimed is:

1. A rotary actuator, comprising:
   a crankshaft;
   a first eccentric gear which is disposed on a first end of said crankshaft and which is equipped with circular arc gear teeth;
   a first end plate;
   a first crosslink which is disposed between said first eccentric gear and said first end plate, and which has a first set of surface features on a surface thereof which engage a second set of surface features on said first eccentric gear;
   a second eccentric gear;
   a second end plate;
   a second crosslink disposed between said second eccentric gear and said second end plate;
   a stator disposed between said first and second eccentric gears; and
   a rotor.

2. The rotary actuator of claim 1, wherein said rotary actuator is a parallel eccentric actuator.

3. The rotary actuator of claim 1, further comprising a set of fixed internal gears and a set of output internal gears, and wherein the shortest force path extending between the set of fixed internal gears and the set of output internal gears does not pass through any roller bearings.

4. The rotary actuator of claim 1, further comprising:
a first support plate attached to a first surface of said stator.

5. The rotary actuator of claim 4, further comprising:
a second support plate attached to a second surface of said stator.

6. The rotary actuator of claim 5, wherein said first and second support plates are disposed concentrically about said crankshaft.

7. The rotary actuator of claim 4, wherein said first and second sets of circular arc gear teeth are in hypocyclic motion when the rotary actuator is activated.

8. The rotary actuator of claim 1, wherein said second eccentric gear is equipped with a second set of circular arc gear teeth.

9. The rotary actuator of claim 1, wherein said first and second eccentric gears oscillate, but do not rotate, when the rotary actuator is activated.

10. The rotary actuator of claim 1, wherein said first and second eccentric gears are oscillating parallel external gears.

11. The rotary actuator of claim 10, wherein said first and second eccentric gears mesh with a single output internal gear.

12. The rotary actuator of claim 11, wherein said internal gear is supported by a plurality of parallel, spaced apart rolling element bearings.

13. The rotary actuator of claim 1, wherein said first set of circular arc gear teeth have a pressure angle in the range of 6° to 8°.

14. The rotary actuator of claim 1, wherein said first and second sets of circular arc gear teeth have pressure angles of about 7°.

15. The rotary actuator of claim 1, wherein each member of said first set of surface features is complimentary in shape to a member of said second set of surface features.

16. The rotary actuator of claim 1, wherein each member of said first set of surface features is a protrusion, and wherein each member of said second set of surface features is a depression.

17. The rotary actuator of claim 1, wherein said second crosslink has a third set of surface features on a surface thereof which engage a fourth set of surface features on said second eccentric gear.

* * * * *